US009092829B2

(12) United States Patent
Fleischman et al.

(10) Patent No.: US 9,092,829 B2
(45) Date of Patent: Jul. 28, 2015

(54) GENERATING AUDIENCE RESPONSE METRICS AND RATINGS FROM SOCIAL INTEREST IN TIME-BASED MEDIA

(71) Applicant: Bluefin Labs, Inc., Cambridge, MA (US)

(72) Inventors: Michael Ben Fleischman, Somerville, MA (US); Deb Kumar Roy, Arlington, MA (US); Jeremy Rishel, Maynard, MA (US)

(73) Assignee: Bluefin Labs, Inc., Cambridge, MA (US)

( * ) Notice: Subject to any disclaimer, the term of this patent is extended or adjusted under 35 U.S.C. 154(b) by 0 days.

(21) Appl. No.: 13/975,527

(22) Filed: Aug. 26, 2013

(65) Prior Publication Data

US 2013/0346330 A1 Dec. 26, 2013

Related U.S. Application Data

(63) Continuation of application No. 13/030,940, filed on Feb. 18, 2011, now Pat. No. 8,543,454.

(51) Int. Cl.

| | |
|---|---|
| ***G06Q 30/00*** | (2012.01) |
| ***G06Q 50/00*** | (2012.01) |
| ***H04N 21/25*** | (2011.01) |
| ***H04N 21/81*** | (2011.01) |
| *G06Q 30/02* | (2012.01) |

(52) U.S. Cl.

CPC ............ *G06Q 50/01* (2013.01); *G06Q 30/0201* (2013.01); *G06Q 30/0245* (2013.01); *H04N 21/252* (2013.01); *H04N 21/8126* (2013.01); *G06Q 30/0242* (2013.01)

(58) Field of Classification Search

USPC ........................................................ 705/14.44

See application file for complete search history.

(56) References Cited

U.S. PATENT DOCUMENTS

| | | | | |
|---|---|---|---|---|
| 6,317,722 | B1 * | 11/2001 | Jacobi et al. | 705/14.51 |
| 7,853,622 | B1 | 12/2010 | Baluja et al. | |
| 7,933,338 | B1 | 4/2011 | Choudhry et al. | |
| 8,151,194 | B1 | 4/2012 | Chan et al. | |
| 2003/0055759 | A1 | 3/2003 | Conkwright et al. | |
| 2003/0115188 | A1 | 6/2003 | Srinivasa et al. | |
| 2004/0034561 | A1 | 2/2004 | Smith | |
| 2005/0154637 | A1 | 7/2005 | Nair et al. | |

(Continued)

OTHER PUBLICATIONS

Peacock, "Radio Audience Estimates", Peacock Research, Inc., Jan. 2005, on line at robertoigarza.files.wordpress.com/2008/11/art-radio-audience-estimates-peacock-20051.pdf.*

(Continued)

*Primary Examiner* — John G Weiss
*Assistant Examiner* — Scott C Anderson
(74) *Attorney, Agent, or Firm* — Fenwick & West LLP

(57) ABSTRACT

Social media content items are mapped to relevant time-based media events. These mappings are used as the basis for calculating metrics based upon the mappings, and ratings of the time-based media there from. Audience response metrics (ARMs) are calculated from the mappings, which provide an indication of audience engagement or response. In addition, ARMs provide information about the virality, depth, and breadth of the response by the viewing audience. The calculated metrics are stored and are used to generate ratings for the time-based media. The ratings may be published in whole or in part, e.g., as part of a ratings system.

22 Claims, 24 Drawing Sheets

(56) References Cited

U.S. PATENT DOCUMENTS

| | | | | |
|---|---|---|---|---|
| 2006/0042483 | A1 * | 3/2006 | Work et al. | 101/91 |
| 2007/0130580 | A1 | 6/2007 | Covell et al. | |
| 2007/0260596 | A1 | 11/2007 | Koran et al. | |
| 2008/0059348 | A1 | 3/2008 | Glassman et al. | |
| 2008/0071796 | A1 | 3/2008 | Ghuneim et al. | |
| 2008/0133638 | A1 | 6/2008 | Fischer et al. | |
| 2008/0270541 | A1 | 10/2008 | Keener et al. | |
| 2009/0083396 | A1 * | 3/2009 | Roos | 709/219 |
| 2010/0037277 | A1 * | 2/2010 | Flynn-Ripley et al. | 725/110 |
| 2010/0281108 | A1 | 11/2010 | Cohen | |
| 2011/0107369 | A1 | 5/2011 | O'Brien et al. | |

OTHER PUBLICATIONS

Coden, Anni et al.; "Multi-Search of Video Segments Indexed by Time-Aligned Annotations of Video Content"; Nov. 18, 1998; IBM Research Report; RC21444(96156); pp. 1-12.

Bouthemy, P. et al., "A Unified Approach to Shot Change Detection and Camera Motion Characterization," IEEE Trans. on Circuits and Systems for Video Technology, Oct. 1999, vol. 9, No. 7.

DeCamp, P. et al., "An Immersive System for Browsing and Visualizing Surveillance Video," Proceedings of ACM Multimedia 2010, Florence, Italy, 2010, 10 pages.

DeCamp, P. et al., "A Human-Machine Collaborative Approach to Tracking Human Movement in Multi-Camera Video," Proceedings of the 2009 International Conference on Content-based Image and Video Retrieval (CIVR), 2009, Santorini, Greece, 8 pages.

Fleischman, M. et al., "Grounded Language Modeling for Automatic Speech Recognition of Sports Video," Proceedings of the Association of Computational Linguistics (ADL), HLT/NAACL. Columbus, OH. Jun. 2008, pp. 121-129.

Fleischman, M. et al., "Unsupervised Content-Based Indexing of Sports Video Retrieval," 9.sup.th ACM Workshop on Multimedia Information Retrieval (MIR), Augsburg, Germany, Sep. 2007, 9 pages.

Fleischman, M. et al., "Temporal Feature Induction for Sports Highlight Classification," ACM Multimedia, Augsburg, Germany, Sep. 2007, pp. 333-336.

Fleischman, M. et al., "Situated Models of Meaning for Sports Video Retrieval," HLT/NAACL, Rochester, NY, Apr. 2007, 4 pages.

Fleischman, M. et al., "Mining Temporal Patterns of Movement for Video Content Classification," 8th ACM SIGMM International Workshop on Multimedia Information Retrieval, Santa Barbara, CA, Oct. 2006, pp. 183-192.

Hauptmann, A. et al., "Story Segmentation and Detection of Commercials in Broadcast News Video," ADL-98 Advances in Digital Libraries Conference, Santa Barbara, CA, Apr. 22-24, 1998, 12 pages.

Jacobs, A. et al., Automatic Shot Boundary Detection Combining Color, Edge, and Motion Features of Adjacent Frames, Center for Computing Technologies, Bremen, Germany, 2004, 10 pages.

Kubat, R. et al., "TotalRecall: Visualization and Semi-Automatic Annotation of Very Large Audio-Visual Corpora," Ninth International Conference on Multimodal Interfaces (ICMI 2007), 2007, 8 pages.

Pang B. et al., "Opinion Mining and Sentiment Analysis," Foundations and Trends in Information Retrieval, 2008, pp. 1-135, vol. 2, No. 1-2.

PCT International Search Report and Written Opinion, PCT Application No. PCT/US10/42362, Sep. 7, 2010, 9 pages.

Tardini et al., "Shot Detection and Motion Analysis for Automatic MPEG-7 Annotation of Sports Videos," 13th International Conference on Image Analysis and Processing, Nov. 2005, 8 pages.

PCT International Search Report and Written Opinion, PCT Application No. PCT/US11/25757, Apr. 19, 2011, 13 pages.

Ah-Pine, J. et al., "Crossing Textual and Visual Content in Different Application Scenarios," Multimedia Tools and Applications, Kluwer Academic Publishers, Nov. 13, 2008, pp. 31-56, vol. 42, No. 1.

European Extended Search Report, European Application No. 10800647.9, Dec. 21, 2012, 7 pages.

Levy, M. et al., "Music Information Retrieval Using Social Tags and Audio," IEEE Transactions on Multimedia, Apr. 2009, pp. 383-395, vol. 11, No. 3.

"MPEG-7 Overview," Martinez, J.M. (ed.), International Organisation for Standardisation, ISO/IEC JTC1/SC29/WG11, Coding of Moving Pictures and Audio, Palma de Mallorca, Oct. 31, 2004, 80 pages, [Online] [Retrieved on Dec. 13, 2012] Retrieved from the Internet<URL:http://mpeg.chiariglione.org/standards/mpeg-7>.

Wattamar, S. S. et al., "Multimedia Explorer: Content Based Multimedia Exploration," Tencon 2008, IEEE Region 10 Conference, Nov. 19, 2008, pp. 1-6.

Kim, S-M. et al., "Extracting Opinions, Opinion Holders, and Topics Expressed in Online News Media Text," Proceedings of the Workshop on Sentiment and Subjectivity In Text, Sydney, Jul. 2006, pp. 1-8.

United States Office Action, U.S. Appl. No. 13/030,940, Jan. 24, 2013, 37 pages.

* cited by examiner

GENERATING AUDIENCE RESPONSE METRICS AND RATINGS FROM SOCIAL INTEREST IN TIME-BASED MEDIA

CROSS-REFERENCE TO RELATED APPLICATION

This application is a continuation application of U.S. patent application Ser. No. 13/030,940, filed Feb. 18, 2011, and entitled "GENERATING AUDIENCE RESPONSE METRICS AND RATINGS FROM SOCIAL INTEREST IN TIME-BASED MEDIA." Accordingly, this application claims benefit of U.S. patent application Ser. No. 13/030,940 under 35 U.S.C. §120. U.S. patent application Ser. No. 13/030,940 is hereby incorporated by reference in its entirety.

BACKGROUND OF THE INVENTION

The present invention relates generally to using social media to estimate interest in media events, and in particular to using social media content items mapped to time-based media events for generating metrics and ratings for time-based media.

Online social media services, such as social networking sites, news aggregators, blogs, and the like provide a rich environment for users to comment on events of interest and communicate with other users. Content items contributed by users of these social media services often include references to events that appear in time-based media such as television shows, advertisements, news reports, sporting events, movies, concert performances, and the like. However, while the content items sometimes refer to time-based media, traditionally there has been no way to aggregate the social media content items and associate them with those events, or with the time-based media in which those events occur.

Consumption-based metrics (CBMs) are available for much of today's broadcast programming. While such metrics provide information about how certain time-based media is consumed (e.g., the size of an audience of a particular television show), they do not provide any indication of the level of engagement of an audience or its level of response. In addition, CBMs provide no information about the virality of the time-based media, and little information about the depth and breadth of the viewing audience's interest.

SUMMARY OF THE INVENTION

Social media content items and references to events that occur therein are aligned with the time-based media events they describe. These mappings are used as the basis for multiple applications, including calculating metrics based upon the mappings, and ratings of the time-based media there from. Other applications include ranking of search results for time-based media, automatic recommendations for time-based media, prediction of audience interest for media purchasing/planning, and estimating social interest in the time-based media. Social interest in time-based media (e.g., video and audio streams and recordings) segments is estimated through a process of data ingestion and integration.

For an event appearing in time-based media, which event may have been identified by segmentation of the time-based media, social media content items are identified as potentially relevant to the event. The probability that the content item is relevant to the time-based media event is determined for each social media content item, and a confidence score reflecting the probability is assigned to the content item. Content items with higher probabilities are mapped to the event and stored.

Audience response metrics (ARMs) are calculated from the mappings, and provide a measure of the extent, depth, or degree of audience engagement with, or response to, the social media content items. In addition, ARMs provide information about the virality of the response by the viewing audience of the time based media. The calculated metrics are stored and are used to generate ratings for the time-based media. The ratings may be published in whole or in part, e.g., as part of a ratings system.

The features and advantages described in this summary and the following detailed description are not all-inclusive. Many additional features and advantages will be apparent to one of ordinary skill in the art in view of the drawings, specification, and claims hereof.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
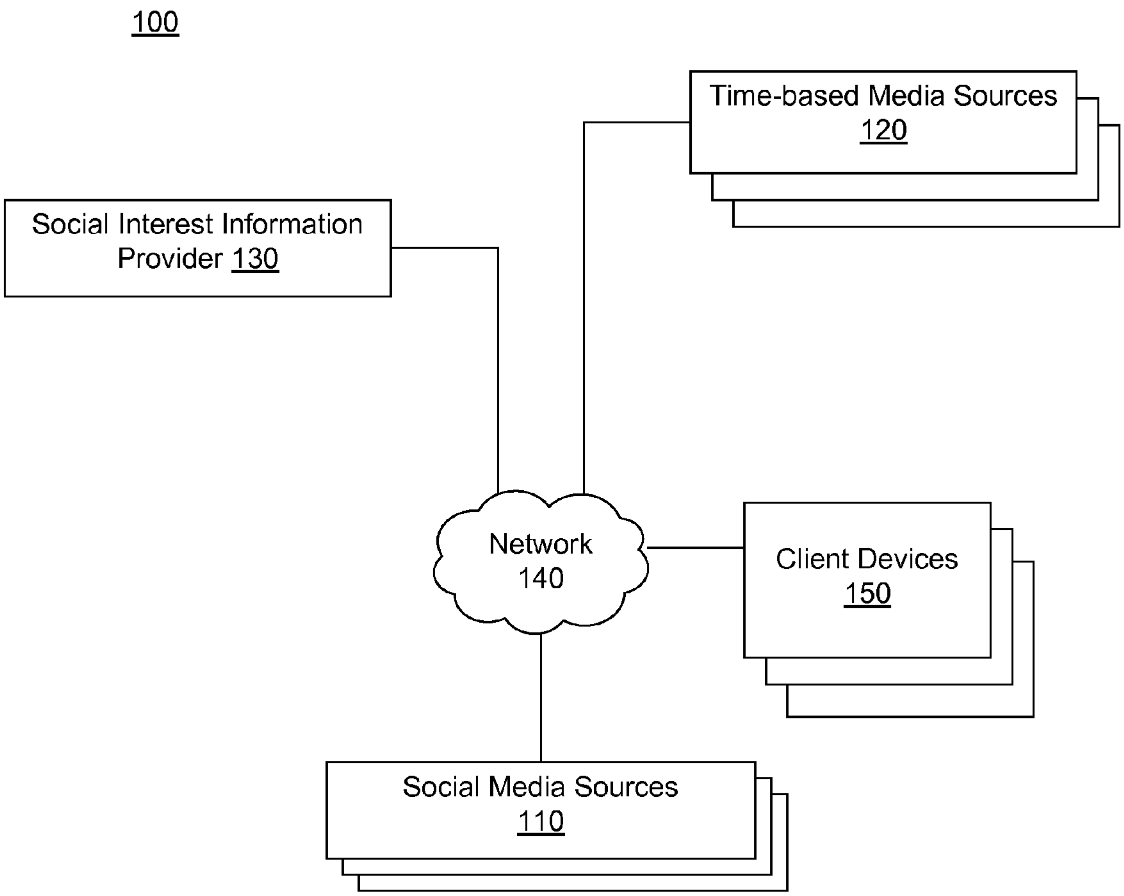
FIG. 1 illustrates the computing environment of one embodiment of a system for associating social media content items with time-based media events and determining social interest in the events based on the resulting associations.

FIG. 1 illustrates the computing environment 100 for one embodiment of a system 130 for associating social media content items and references to events therein with time-based media events and determining social interest in the events based on the resulting associations.

The environment 100 includes social media sources 110, time-based media sources 120, the social interest information provider 130, a network 140, and client devices 150.

The social media sources 110 include social networks, blogs, news media, forums, user groups, etc. These sources generally provide a plurality of users with the ability to communicate and interact with other users of the source. Users can typically contribute various content items (e.g., posts, videos, photos, links, status updates, blog entries, tweets, and the like), which may refer to media events, and can engage in discussions, games, online events, and other participatory services.

The time-based media sources 120 include broadcasters, direct content providers, advertisers, and any other third-party providers of time-based media content. These sources 120 typically publish content such as television programs, videos, movies, serials, audio recordings, and the like.

Figure 2:
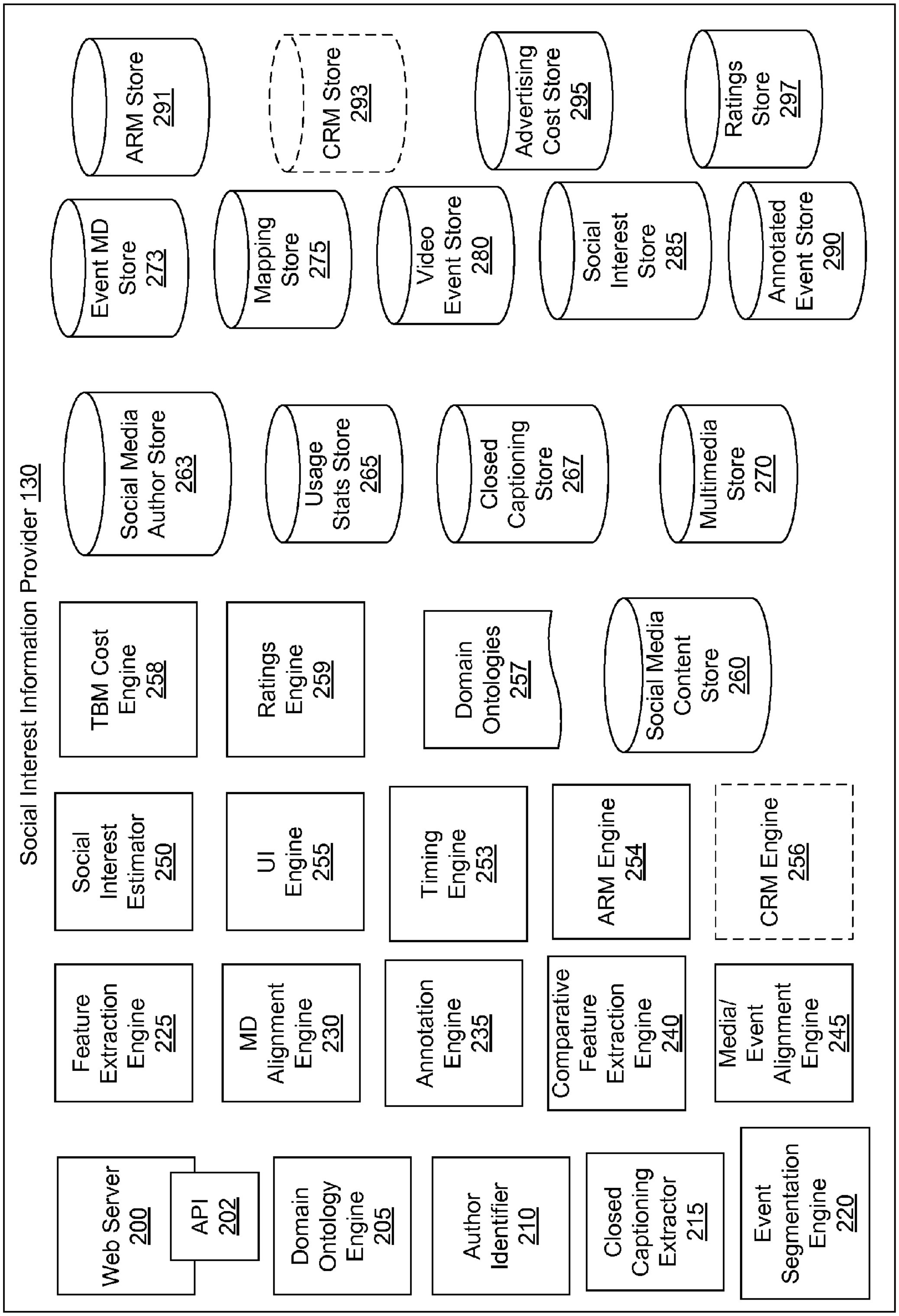
FIG. 2 is a block diagram of one embodiment of a social interest information provider.

The social interest information provider 130 provides a system for associating social media content items and references to events therein with time-based media events and determining social interest in the events based on the resulting associations, and is further described in conjunction with FIG. 2.

The network 140 may comprise any combination of local area and/or wide area networks, the Internet, or one or more intranets, using both wired and wireless communication systems.

The client devices 150 comprise computing devices that can receive input from a user and can transmit and receive data via the network 140. For example, client devices 150 may be a desktop computer, a laptop computer, a smart phone, a personal digital assistant (PDAs), or any other device including computing functionality and data communication capabilities. A client device 150 is configured to communicate with the social media sources 110 and the social interest information provider system 130 via the network 140.

FIG. 2 is a block diagram of one embodiment of a social interest information provider 130. The embodiment of the social interest information provider 130 shown in FIG. 2 is a computer system that includes a web server 200 and associated API 202, a domain ontology engine 205, an author identifier 210, a closed captioning extractor 215, an event segmentation engine 220, a feature extraction engine 225, a metadata alignment engine 230, an annotation engine 235, a comparative feature extraction engine 240, a media event/alignment engine 245, a social interest estimator 250, a user interface engine 255, domain ontologies 257, a social media content store 260, a social media author store 263, a usage stats store 265, a closed captioning store 267, a multimedia store 270, an event metadata store 273, a mapping store 275, a video event store 280, a social interest store 285, and an annotated event store 290. One embodiment of the social interest information provider 130 also includes a timing engine 253, an ARM engine 254, an optional CRM engine 256, a time-based media cost engine 258, and a ratings engine 259, as well as an ARM store 291, a CRM store 293, an advertising cost store 295, and a ratings store 297.

This system may be implemented using a single computer, or a network of computers, including cloud-based computer implementations. The computers are preferably server class computers including one or more high-performance CPUs, 1G or more of main memory, as well as 500 GB to 2 Tb of computer readable, persistent storage, and running an operating system such as LINUX or variants thereof. The operations of the system 130 as described can be controlled through either hardware or through computer programs installed in computer storage and executed by the processors of such servers to perform the functions described herein. The system 130 includes other hardware elements necessary for the operations described here, including network interfaces and protocols, security systems, input devices for data entry, and output devices for display, printing, or other presentations of data; these and other conventional components are not shown so as to not obscure the relevant details.

As noted above, system 130 comprises a number of "engines," which refers to computational logic for providing the specified functionality. An engine can be implemented in hardware, firmware, and/or software. An engine may sometimes be equivalently referred to as a "module" or a "server." It will be understood that the named components represent one embodiment of the present invention, and other embodiments may include other components. In addition, other embodiments may lack the components described herein and/or distribute the described functionality among the components in a different manner. Additionally, the functionalities attributed to more than one component can be incorporated into a single component. Where the engines described herein are implemented as software, the engine can be implemented as a standalone program, but can also be implemented through other means, for example as part of a larger program, as a plurality of separate programs, or as one or more statically or dynamically linked libraries. In any of these software implementations, the engines are stored on the computer readable persistent storage devices of the system 130, loaded into memory, and executed by the one or more processors of the system's computers. The operations of the system 130 and its various components will be further described below with respect to FIG. 2 and the remaining figures. As will become apparent, the various data processing operations described herein are sufficiently complex and time consuming as to require the operation of a computer system such as the system 130.

The web server 200 links the social interest information provider 130 to the client devices 150, the time-based media sources 120, and the social media sources 110 via network 140, and is one means for doing so. The web server 200 serves web pages, as well as other web related content, such as Java, Flash, XML, and so forth. The web server 200 may include a mail server or other messaging functionality for receiving and routing messages between the social interest information provider 130 and client devices 150.

The API 202, in conjunction with web server 200, allows one or more external entities to access information from the social interest information provider 130. The web server 200 may also allow external entities to send information to the social interest information provider 130 calling the API 202. For example, an external entity sends an API request to the social interest information provider 130 via the network 140 and the web server 200 receives the API request. The web server 200 processes the request by calling an API 202 associated with the API request to generate an appropriate response, which the web server 200 communicates to the external entity via the network 140. The API 202 can be used for the social interest information provider 130 to receive extracted features and other inputs to the social media/event alignment 330 and social interest estimation 340 processes from third parties (such as entities providing the time-based media), which then would be used by the social interest information provider 130 in those processes. As another example, the social interest information provider 130 can expose an API (e.g., 202) through which an advertiser or other interested third party could input key words (e.g., product names, show name, particular sporting event, particular instance/episode of a show, etc.) and in turn receive ratings information as described herein associated with the keyword. The API could allow the third party to specify the type(s) of rating information desired as well, which data may be associated with various price points set by the social interest information provider 130. The API could allow for other settings for the third party to receive the ratings data, e.g., to receive the data "real-time" or very close in time to it being generated, or to specify ahead of time when to provide the ratings data, how often to provide an update to the ratings data, etc.

Domain ontology engine 205 provides domain ontologies indicating vocabularies specific to different media domains for storage in the domain ontologies 257, and is one means for doing so. The domain ontologies 257 encode information relevant to specific domains, and are beneficial, since nicknames, slang, acronyms, and other shortened terms commonly are used in certain domains. Domain ontologies 257 may be organized hierarchically as graphs, where each node in the graph represents a concept (e.g. "football play," "scoring play") and each edge represents a relation between concepts (e.g. "type of"). Concept instances (e.g., a specific touchdown play from a specific football game) may also be encoded in the domain ontology, as well as, vocabularies that provide alternate terminology for concept nodes (e.g. "TD" for concept "touchdown"). The domain ontologies 257 may be engineered based on the knowledge of human experts or machine-generated. The domain ontologies are used for initial filtering of social media posts and in the social media/event alignment process. An exemplary list of social interest domains for which time-based media is used according to the present invention includes broadcast video such as television programs, such as sports, news, episodic television, reality/live event shows, movies, and advertising in conjunction with any of these domains. More specific domains also are possible, e.g., football games, entertainment news, specific reality TV shows, etc., each of which may have their own domain-specific ontology. The domain ontology engine 205 is configured to filter the time segments according to a search term, wherein the graphical display displays only a subset of the series of chronological time segments corresponding to the search term.

The author identifier 210 identifies the author, or provider, of each social media content item, e.g., as provided to the social interest information provider 130 by the social media sources 110 with the content items, and is one means for doing so. Additional information about the authors may be extracted from the content items themselves, e.g., as stored in the social media content store 260, or extracted from other external sources. The author information is stored in the social media author store 263. In some embodiments, the author information includes the network structure of the authors network(s), e.g., including how many other users of the network(s) are connected to the author within the network(s). This information is used, e.g., for calculations that capture the resonance of audience response to an event amongst other users within the social networks of the authors of content items.

The closed captioning extractor 215 extracts closed captioning data from the time-based media, and is one means for doing so. Closed captioning data typically can be extracted from broadcast video or other sources encoded with closed captions using open source software such as CCExtractor available via SourceForge.net. For time-based media not encoded with closed captioning data, imperfect methods such as automatic speech recognition can be used to capture and convert the audio data into a text stream comparable to closed captioning text. This can be done, for example, using open source software such as Sphinx 3 available via SourceForge.net. Once the closed captioning is ingested, it is preferably aligned to speech in a video. Various alignment methods are known in the art. One such method is described in Hauptmann, A. and Witbrock, M., *Story Segmentation and Detection of Commercials in Broadcast News Video*, ADL-98 Advances in Digital Libraries Conference, Santa Barbara, Calif. (April 1998), which uses dynamic programming to align words in the closed captioning stream to the output of a speech recognizer run over the audio track of the video. The closed captioning information is stored in the closed captioning store 267.

The multimedia store 270 stores various forms of time-based media. Time-based media includes any data that changes meaningfully with respect to time. Examples include, and are not limited to, videos, (e.g., television programs or portions thereof, movies or portions thereof) audio recordings, MIDI sequences, animations, and combinations thereof. Time-based media can be obtained from a variety of sources, such as local or network stores, as well as directly from capture devices such as cameras, microphones, and live broadcasts. It is anticipated that other types of time-based media within the scope of the invention will be developed in the future (e.g., 3D media, holographic presentations, immersive media, and so forth).

The event segmentation engine 220 segments time-based media into semantically meaningful segments corresponding to discrete portions or "events," and is one means for doing so. Different types of media may have different types of events which are recognized as part of a video event segmentation process. For example, a television program or movie may have scenes and shots; a sporting event may have highly granular events (e.g., plays, passes, catches, hits, shots, baskets, goals, and the like) as well has less granular events (e.g., sides, downs, innings, and the like). A news program may have events such as stories, interviews, shots, commentary and the like. The video event segmentation process includes three main components according to one embodiment: shot boundary detection, event detection, and boundary determination. These components for event segmentation may vary by domain. The output of video event segmentation is a set of segmented video events that is stored in the video event store 280.

The feature extraction engine 225 converts segmented time-based media events retrieved from the video event store 280 into feature vector representations for aligning the events with metadata, and is one means for doing so. The features may include image and audio properties and may vary by domain. Feature types may include, but are not limited to, scale-variant feature transform (SIFT), speeded up robust features (SURF), local energy based shape histogram (LESH), color histogram, and gradient location orientation histogram (GLOH).

The metadata alignment engine 230 aligns video event segments with semantically meaningful information regarding the event or topic that the event is about, and is one means for doing so. The metadata alignment engine 230 uses metadata instances from the event metadata store 273. A metadata instance is the metadata for a single event, i.e., a single piece of metadata. The annotation engine 235 annotates the segments with the metadata, and is one means for doing so. Metadata instances may include automatic annotations of low level content features, e.g., image features or content features, hand annotations with text descriptions, or both. The metadata may be represented as text descriptions of time-based media events and/or feature vector representations extracted from examples of events. The annotations are stored in the annotated event store 290.

The comparative feature extraction engine 240 converts an annotated event and a corresponding social media content item into a feature vector representation, and is one means for doing so. The three major types of features extracted by the comparative feature extraction engine 240 are content features, geo-temporal features, and authority features. The media/event alignment engine 245 aligns the social media content item 610 and annotated event 530 using the extracted features 620, and is one means for doing so. The media/event alignment engine 245 outputs an annotated event/social media mapping and associated confidence score to the mapping store 275.

The following is a non-comprehensive list of media types that can be associated with time-based media: audio of commentators on, or participants of, the event or topic (e.g., announcers on TV or radio) and text transcriptions thereof (generated manually or automatically), event-related metadata (e.g., recipes, instructions, scripts, etc.), statistical data (e.g., sports statistics or financial data streams), news articles, social media content items, and media usage statistics (e.g., user behavior such as viewing, rewind, pausing, etc.). The social media content items include long form and short form social media content items such as posts, videos, photos, links, status updates, blog entries, tweets, and the like from various social media and mainstream news sources that are stored in the social media content store 260. In general, social networks allow their users to publish text-based content items to other members of their network, which content items may be open and viewable by the public through open application program interfaces.

Typically social media content items are of two varieties: static text-based media and dynamic text-based media. Static text-based media describes a large class of information on the Internet (e.g., blogs, news articles, web pages, etc.). This information changes only minimally once posted (i.e., is relatively static) and is primarily made up of words (i.e., is text-based). Dynamic text-based media refer to any of a set of "data feeds" composed of short, frequently updated user posts to social network websites that often describe the states and opinions of their authors.

For some domains, usage statistics may be ingested, either alone or generated from the time-based media in the multimedia store 270, and stored in the usage stats store 265. Usage statistics may include information regarding how the multimedia data was consumed, e.g., number of views, length of views, number of pauses, time codes at which a pause occurs, etc. The statistics can be aggregated with respect to different populations, such as by user type, location, usage type, media type, and so forth. The statistics can represent means, modes, medians, variances, rates, velocities, population measures, and the like.

The social interest estimator 250 aggregates information from the annotated event store 290 and the mapping store 275 to estimate social interest in a given media event using a social interest score, and is one means for doing so. The social interest score is estimated by the social interest estimator 250 by cycling through all (or selected) annotated events, and for each event, taking a weighted sum of the confidence scores for each social media content item that exceeds a given threshold. The resulting social interest score is stored in the social interest store 285.

The user interface engine 255 converts the social interest into a format for display on a user interface, e.g., for depicting social interest heat maps as shown in FIGS. 8A-13D, and is one means for doing so. The user interface engine 255 allows the client devices 150 to interact with the user interfaces providing the social interest score.

The user interface engine 255 provides a user interface display with three main areas: (1) a social interest heat map area for displaying a social interest heat map showing the levels of social interest for a plurality of events corresponding to a series of chronological time segments, (2) a media display area, visually distinguished from and concurrently displayed with the social interest heat map area, for displaying an event selected from the social interest heat map, and (3) a social media display area, visually distinguished from and concurrently displayed with the social interest heat map and media display areas, for displaying social media content items for the selected event.

Different event types may be displayed such that the different event types each are visually distinct within the social interest heat map area, e.g., for a football game on broadcast television, showing events corresponding to plays of the game in one manner (e.g., a first color) and events corresponding to commercials in between plays of the game in a different manner (e.g., a second color).

In addition, the user interface engine 255 may provide additional functionality for the user interface. For example, a user interface field for filtering the time segments according to a keyword or search term, wherein the social interest heat map area then displays only a subset of time segments matching the search term. See FIG. 11A, reference numeral 1105. In another example, the user interface may allow for separate display of positive and negative sentiment among aggregated content items for each event segment. A first portion of the segment may correspond to a positive sentiment, a second portion of the segment may correspond to a negative sentiment, and both segments may be displayed, such that they are visually distinguished from each other. See FIG. 10A, reference numerals 1010, 1012. In some embodiments, an additional portion of the segment may correspond to neutral or uncertain sentiment. The domain ontology engine 205 may provide the filtering aspects for the user interface, and the social interest estimator 250 may provide the sentiment analysis.

The timing engine 253 extracts detailed timing information from time-based media events and portions thereof, and is one means for doing so. For example, if a particular ARM compares two time-delimited portions of a time-based media event, e.g., the first ten minutes versus the last ten minutes, or two commercials within an event, etc., the timing engine 253 provides additional timing information for the time-based media event such that the desired portions are individually identifiable within the event as a whole. In addition, the timing engine 253 can extract and store basic timing information to the mapping store 275 if not already present. Basic timing information may include, for example, the length of a media event, time it aired, time and/or length of portions of events within a show or larger event, and time elapsed between two times, as well as timing aspects related to the manner of observation as discussed below. In addition, the timing engine 253 can identify broadcast time periods (e.g., midday, primetime, etc.), pre-event time periods (for anticipation calculations), post-event time periods (e.g., for calculating delayed response that occurs greater than a threshold time after the time-based media event), etc. In one embodiment, the additional timing information is added to the annotations associated with a time-based media/social media mapping as stored in the mapping store 275.

For some events, e.g., shows on broadcast television, the timing information can be extracted from a programming guide or other source of programming information (e.g., a website for a network, etc.). For other events, e.g., commercials, programming guide-type information may not be available. For these events, the timing information may be derived, e.g., via the video event segmentation 310 and video metadata alignment/annotation 320 processes described herein.

The timing engine 253 also may capture information indicating whether the audience response is to an event that they observe live (e.g., the first run of a television show) or at different times (e.g., as a rerun of the first run broadcast, on demand technologies or other time-shifted viewing). This timing information may be obtained based on whether the time of response is near in time to the time of broadcast, location of viewing (e.g., if viewed via a website), or provided viewing information (e.g., a content item indicates that it was watched via DVR), to name a few means of determining this information. In other embodiments, other methods of determining viewing times are used.

The audience response metrics (ARM) engine 254 generates all of the various audience response metrics described herein, and is one means for doing so. The input to the ARM engine 254 is the mappings stored in the mapping store 275, as well as other possible information, e.g., from the timing engine 253, the consumption-based metrics engine 256 and store 293, the time-based media cost engine 258 and store 295, the social media author store 263, and the social media content store 260. The ARM engine 254 executes any of the steps necessary for the metrics calculations, such as selection of events, portions/times within events, comparisons of events, determination of number of unique authors from the plurality of authors, and calculations of ARMs. The determination and use of various ARMS is further described below.

For example, the ARM engine 254 can generate event-specific and comparative content item-based ARMs, based on the number of social media content items associated with time-based media events and unique author ARMs, based on the number of unique authors of social media content items associated with time-based media events. The ARM engine 254 can apply various filters to the various ARMs, can combine ARMs with other ARMS to generate multiple factor ARMs, with consumption based metrics (CBMs), and/or with monetary values associated with time-based media events.

The ARM store 291 stores the generated ARMs for further ARM generation by the ARM engine 254, ratings determinations by the ratings engine 259, or other uses, and is one means for doing so.

The consumption-based metrics (CBM) engine 256 collects and/or generates consumption based metrics, which are measures of audience consumption (e.g., size of viewing population, etc.), and is one means for doing so. According to one embodiment the CBM engine 256 simply collects CBMs from a third party for use by the ARM engine 254 in generating the metrics described herein. In another embodiment, the CBM engine 256 generates the CBMs based upon raw data feeds of audience behavior that is input to the engine. The CBM store 293 stores the collected and/or generated CBMs, e.g., for use by the ARM engine 254.

The time-based media cost engine 258 communicates with third party resources and collects information regarding the cost of airing a show or advertising, e.g., for a given time period, on a particular channel, and is used by the ARM engine 254, and is one means for doing so. The time-based media cost store 295 stores the collected advertising cost information.

The ratings engine 259 creates, and may publish, ratings based on any of the metrics described herein or combinations thereof, and is one means for doing so. The term ratings, as used herein, refers to how one or more ARMs compare to the same ARM(s) for different events of the same type, in the same time slot, etc. For example, the Audience Response Count (ARC), is a one type of ARM, and is a total number of social media content items aligned with a given time-based media event). Thus, imagine a broadcast television show, Neighbors, which is a half-hour comedy sitcom that airs at 8 pm on Thursdays starting on Network A. The ARC for the show in this example could 12,500. The ARC ratings for primetime Thursdays, for this show and two others in this example could be:

1. Found (9 pm, 60 min, Network A)—ARC 14,500
2. Neighbors (8 pm, 30 min, Network B)—ARC 12,500
3. 8 pm News (8 pm, 60 min, Network C)—ARC 11,750

Thus, these ratings show how Neighbors compares to other shows using ARC Thursdays, and primetime as the criteria for inclusion in the comparison. Neighbors is second in the ratings for primetime Thursdays per the above. However, Neighbors might score differently in the ratings if a different ARM is chosen for the ratings determination (e.g., if ARR is used, with a filter for length of show, as both Found and the 8 pm news are 60 minutes long), or if a different time period is used (e.g., primetime across all days of the week), or types of shows (e.g., all comedies), if a combination of metrics are used (e.g., UARM and CRM), etc.

Therefore, the ratings engine 259 aggregates values for all shows using a particular metric (or metrics) and possible other criteria, to show ratings as a comparison between shows meeting the criteria. Once ratings are determined by the ratings engine 259, they are stored in the ratings store 297. The ratings may be published in whole or in part according to some embodiments, or may be used as information for determinations of content creation, media planning, and/or media buying.

Mapping Social Media Content Items to Time-Based Media

Figure 3:
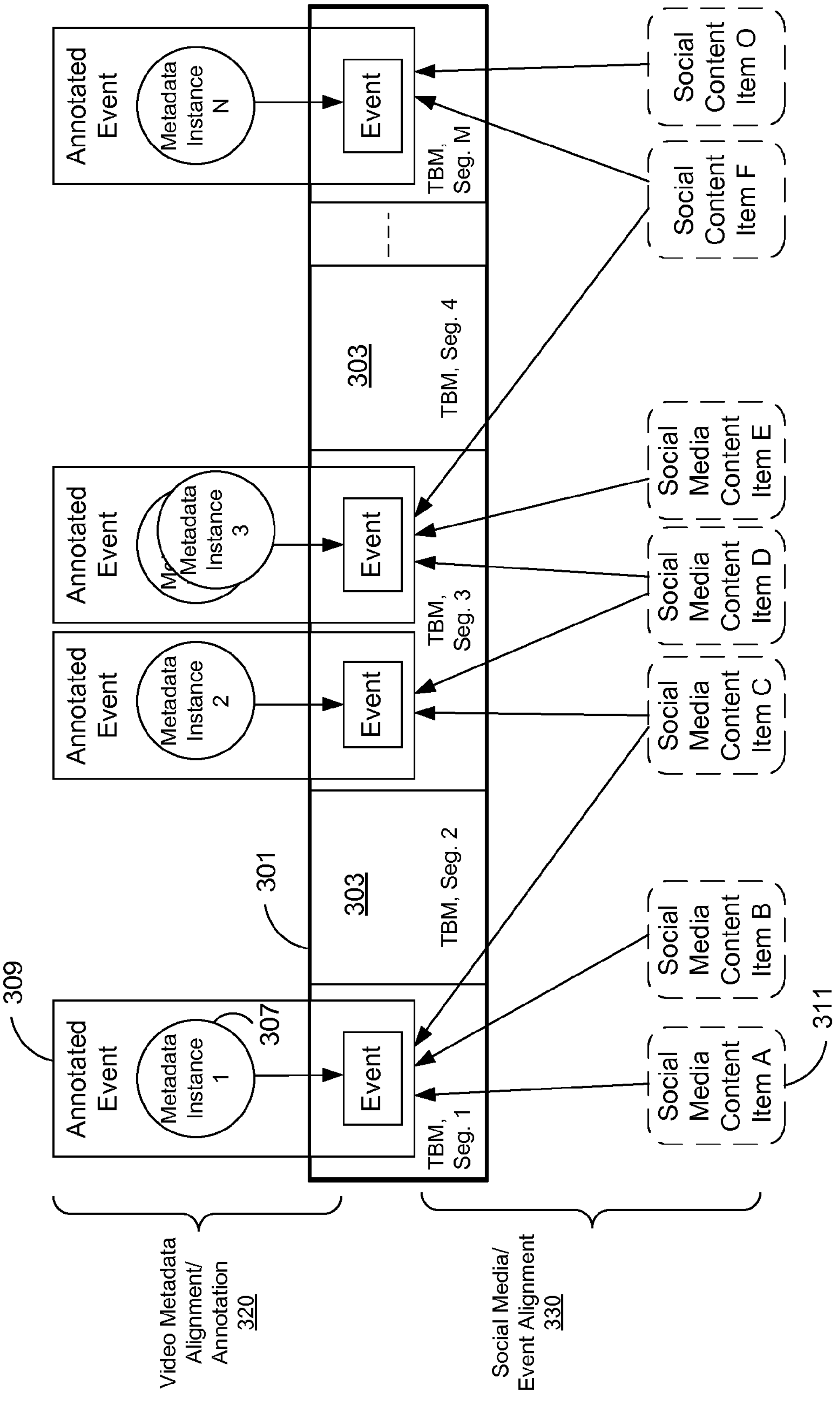
FIG. 3 is a conceptual diagram illustrating the video/metadata alignment/annotation and social media/event alignment processes at a high level according to one embodiment.

FIG. 3 is a conceptual diagram illustrating the video/metadata alignment/annotation 320 and social media/event alignment 330 processes at a high level according to one embodiment. Beginning with metadata instances 307 and events in time-based media 301 as input, annotated events 309 are formed. As shown, time-based media (TBM) 301 includes multiple segments (seg. 1-M) 303, which contain events in the time-based media, as described herein. The video/metadata alignment/annotation 320 process aligns one or more metadata instances (1-N) 307 with the events to form annotated events 309, as further described in conjunction with FIG. 5. The social media/event alignment 330 process aligns, or "maps," the annotated events 309 from the video/metadata alignment/annotation 320 to one or more social media content items (A-O) 311, as further described in conjunction with FIG. 6. Note that in both processes 320, 330, the various alignments are one-to-one, many-to-one, and/or many-to-many. Thus, a given social media content item 311 can be mapped to multiple different annotated events 309, and an annotated event 309 can be mapped to multiple different social media content items 311. Once so mapped, the relationships between content items and events can be quantified to estimate social interest, as further explained below.

Figure 3A:
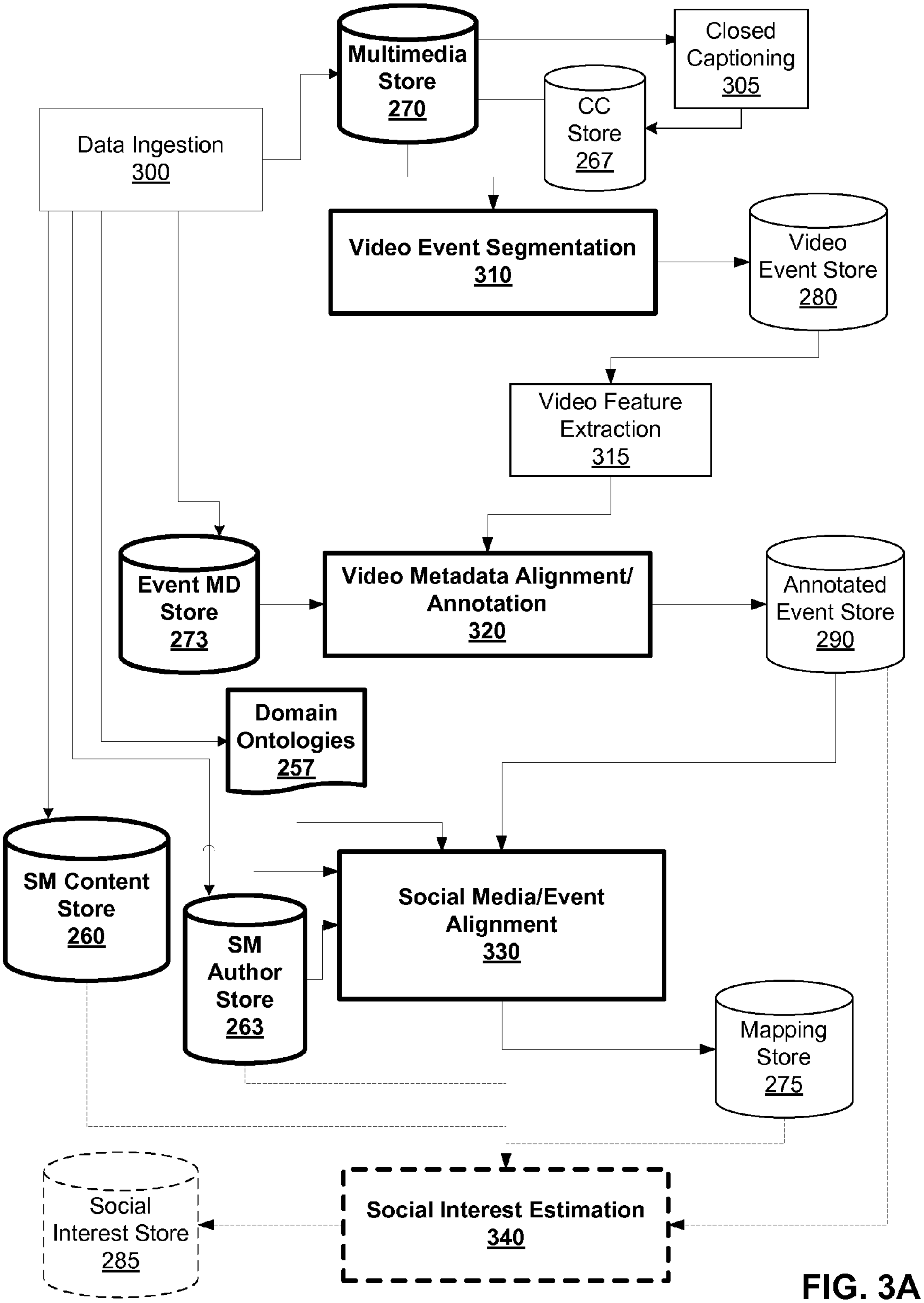
FIG. 3A is a flow diagram illustrating one embodiment of a method for associating social media content items with time-based media events, and a related method of determining social interest in the events based on the resulting associations.

FIG. 3A is a flow diagram illustrating one embodiment of a method for aligning social media content items (and references to events therein) with time-based media events, and a related method of determining social interest in the events based on the resulting associations.

Generally, social media content items are candidates for aligning with time-based media events, and a confidence score is determined for each indicative of a probability that the content item is relevant to the event. Based on the confidence scores, the content items may be aligned with the event, and the alignments are collected in a data store. The confidence scores are aggregated to produce an aggregate score, and a level of social interest in the event is established based upon the aggregate score.

As a preliminary step in the method, multiple streams of data are ingested 300 at the social interest information provider 130 for processing. Data may be received at the social interest information provider 130 directly from content providers, or via social media sources 110 or time-based media sources 120, e.g., from broadcast television feeds, directly from content producers, and/or from other third parties. In one embodiment, web server 200 is one means for ingesting 300 the data. The types of data may include, but are not limited to, time-based media, closed captioning data, statistics, social media posts, mainstream news media, and usage statistics, such as described above.

The ingested data is stored in data stores specific to one or more data types that serve as the input data sources for the primary processes of the method of FIG. 3A (each shown in bold). For example, time-based media data is stored in the multimedia store 270. The time-based media in the multimedia store 270 may undergo additional processing before being used within the methods shown in FIGS. 3-7. For example, closed captioning data can be extracted from, or created for 305, the time-based media, e.g., by closed captioning extractor 215. In addition, for some domains, usage statistics may be ingested, either alone or generated from the time-based media in the multimedia store 270, and stored in the usage stats store 265. In addition, event metadata associated with multimedia is stored in the event metadata store 273, social media content items as described herein are stored in the social media content store 260, information about authors of social media content items are stored in the social media author store 263, and domain ontologies indicating, for example, vocabularies specific to different media types, are stored in the domain ontologies 257.

As a result of the ingestion referenced above, the multimedia store 270 includes various forms of time-based media. The time-based media may be of various types, as described in conjunction with FIG. 2.

As shown in FIG. 3A, there are three major processes involved in the method according to the depicted embodiment: video event segmentation 310, video metadata alignment 320, and social media/event alignment/mapping 330. In addition, an optional process, social interest estimation 340, may be included in the method. Each of these processes 310-340 are described below.

Video Event Segmentation

The first process is video event segmentation 310, in which the time-based media is segmented into semantically meaningful segments corresponding to discrete events depicted in video. The input to the video event segmentation 310 process is a raw video (and/or audio) stream that is retrieved from the multimedia store 270 according to one embodiment, and may be performed, e.g., by the event segmentation engine 220, which is one means for performing this function.

The video event segmentation 310 process is domain dependent to some extent, e.g., in video of sporting events, event segments may be equated with individual plays, while in broadcast television, event segments may be equated with individual scenes and advertisements. Thus the event types and segment size may vary based on the domain type, and for some media, e.g., short format media such as very short video clips, the entire clip is treated as one segment. They system may be pre-configured with information about to which domain the video belongs. This configuration may be implemented by hand on a case by case basis, or based on a preloaded schedule based on the source of video and time of day (using, for example, a programming guide of broadcast television shows).

Segmentation may be achieved via human annotation, known automated methods, or a hybrid human/automatic approach in which automatic segment boundaries are corrected by human annotators according to various embodiments. One automated method is described in Fleischman, M. and Roy, D., *Unsupervised Content-Based Indexing of Sports Video Retrieval,* 9th ACM Workshop on Multimedia Information Retrieval (MIR), Augsburg, Germany (September 2007).

The video event segmentation 310 process includes three main components according to one embodiment: shot boundary detection, event detection, and boundary determination. These components may vary by domain. For example, for sporting events an additional component may correspond to scene classification (e.g., field or stadium identification).

The output of video event segmentation 310 is a set of segmented video events that are stored in the video event store 280. Video event segmentation 310 is described in further detail in conjunction with FIG. 4.

Metadata Alignment/Annotation

The next process is metadata alignment/annotation 320, in which the segments from video event segmentation 310 are annotated with semantically meaningful information regarding the event that the segment is relevant to, or depicts. Input to metadata alignment/annotation 320 is a video event retrieved from the video event store 280 and metadata from the event metadata store 273. Such metadata can include, but is not limited to: the type of event occurring, the agents involved in the event, the location of the event, the time of the event, the results/causes of the event, etc.

As with event segmentation 310, the metadata alignment/annotation 320 process is domain dependent. For example, in American football, metadata for an event may include information such as "Passer: Tom Brady, Result: Touchdown, Receiver: Randy Moss," while metadata for an event in a television series may include information such as: "Agent: Jack Bauer, Location: White House, Time: 3:15 pm," and for an advertisement the metadata may include information such as "Brand: Walmart, Scene: father dresses up as clown, Mood: comic." As illustrated in these examples, the metadata can be structured as tuples of <name, value> pairs.

The metadata includes text and, for certain domains, lower level image and audio properties. Metadata may be generated using human annotation (e.g., via human annotators watching events or samples thereof) and, in certain domains, may be supplemented with automatic annotations for use in the alignment process (e.g., describing lower level image and audio properties of the event such as number and length of each shot, average color histograms of each shot, power levels of the associated audio, etc.) The annotation is stored in the annotated event store 290.

Metadata alignment/annotation 320 includes two steps according to one embodiment: event feature extraction and video metadata alignment. Metadata alignment/annotation 320 is described in further detail in conjunction with FIG. 5.

According to another embodiment, data ingestion 300, video event segmentation 310, and video metadata alignment 320 could be performed by a separate entity, such as a content provider or owner, e.g., which does not want to release the content to others. In this embodiment, the social interest information provider 130 would provide software, including the software modules and engines described herein, to the separate entity to allow them to perform these processes on the raw time-based media. The separate entity in return could provide the social interest information provider 130 with the extracted features and other inputs to the social media/event alignment 330 and social interest estimation 340 processes, which then would be used by the social interest information provider 130 in those processes. These data exchanges could take place via an application programming interface (API) provided by the social interest information provider 130 and exposed to the separate entity, e.g., via web server 200. The social interest information provider 130 would then compute the social interest information and provide that back to the entity, as either data, or displayed information, for example using the interfaces shown in FIGS. 8A-13D.

Social Media/Event Alignment

The next step is to integrate the annotated time-based media event segments with social media content items that refer to the events. Input to social media/event alignment 330 according to one embodiment is an annotated event retrieved from the annotated event store 290, a social media content item retrieved from the social media content store 260, a domain ontology retrieved from the domain ontologies 257, and optionally author information about the social media content item author retrieved from the social media author store 263.

Unfortunately, social media content items often are ambiguous as to whether they refer to an event at all, and if so, which event they refer to. For example, a simple social media content item, such as the single word post "Touchdown!" may refer to an event in a football game, or it may be used as a metaphor for a success in areas unrelated to football. In order to address such ambiguities, the social media/event alignment 330 determines a confidence score that a given social media content item refers to a specific event. The method takes as input a single social media content item and a single annotated event, and outputs a score representing the confidence (e.g., likelihood, probability) that the social media content item is relevant to the event. A social media content item can be relevant to an event by referring to the event. The social media/event alignment 330 function operates on features of the individual social media content items and annotated events, and can be trained using supervised learning methods or optimized by hand. The media/event alignment engine 245 is one means for performing this function.

The output of social media/event alignment 330 is a mapping between an annotated event and a social media content item (and/or references to events therein) and an associated confidence score. The mapping and confidence score are stored in a mapping store 275. The social media/event alignment 330 process is described in further detail in conjunction with FIG. 6.

The mappings output by social media/event alignment 330 are useful in and of themselves, as they may be used as the basis for multiple applications, such as, ranking of search results for time-based media, automatic recommendations for time-based media, prediction of audience interest for media purchasing/planning, and estimation of social interest as described further below.

Social Interest Estimation

One of the uses of the social media/event mappings is the estimation of social interest in various events. Social interest in an event may be estimated by aggregating the information gleaned from the processes described with respect to FIG. 3A. The input to social interest estimation 340 is an annotated event retrieved from the annotated event store 290 and the annotated event social media mapping retrieved from the mapping store 275. In addition, inputs from the social media content store 260 and social media author store 263 may be used as part of the weighting process. The social interest estimator 250 is one means for performing this function.

The social interest estimation 340 is achieved for an annotated event by cycling through all social media content items associated with that event (as indicated by the presence of an annotated event/social media mapping 630 (FIG. 6) in the mapping store 275), and taking a weighted sum of the confidence scores for each social media content item. In one embodiment, a weighted sum of the confidence scores is taken for social media content items that exceed a threshold. In other embodiments, no threshold is used or a function with a "sliding scale" of (score, weight) where the weight is applied to the score, and then added to the sum. The effect of this weighting is that the events that are associated with more social media content items (and references to events therein) correlate with higher estimated social interest. In addition, social interest in an event often is dependent on the source, author, and/or sentiment of the social media content item referencing it, as described further in conjunction with weighting function 710 in FIG. 7.

The output of the social interest estimation 340 is a social interest score that is stored in the social interest store 285. The social interest estimation 340 is described in further detail in conjunction with FIG. 7. In addition, the social interest estimation 340 results may be displayed to a user of a social interest information device 150, e.g., using user interface engine 255, as described in conjunction with FIGS. 8A-13D.

The social interest score may be used as the basis for multiple applications, such as data analytics, media planning, ranking of search results for time-based media, automatic recommendations for time-based media, direct end-user data navigation via a user interface, and prediction of audience interest for media purchasing/planning to name a few.

Event Segmentation

Figure 4:
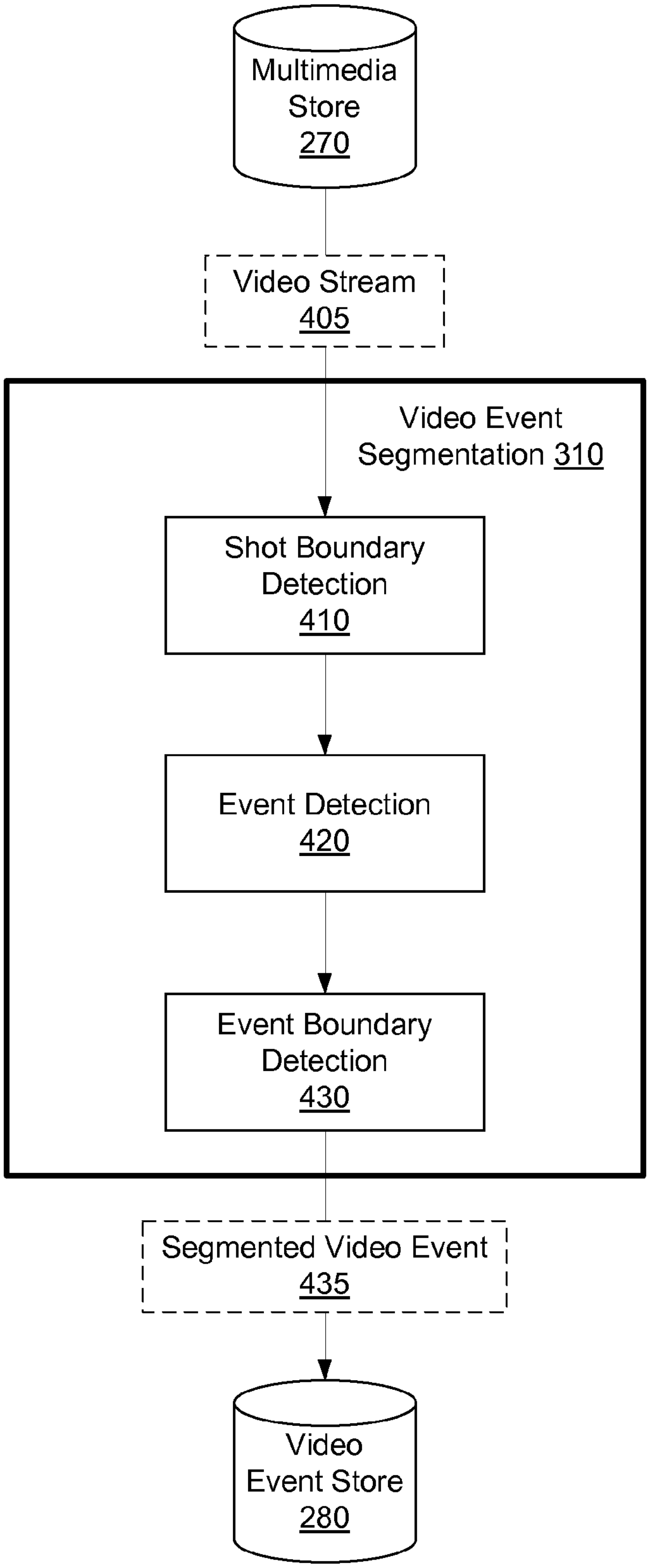
FIG. 4 is a flow diagram illustrating one embodiment of a video event segmentation process.

FIG. 4 is a flow diagram illustrating one embodiment of a video event segmentation process 310. As described in FIG. 3A, video event segmentation 310 segments time-based media into semantically meaningful segments corresponding to discrete video portions or "events," e.g., via event segmentation engine 220, which is one means for performing this function.

Input to the video event segmentation process 310 is a video stream 405 from the multimedia store 270. Video event segmentation 310 includes 3 phases: shot boundary detection 410, event detection 420, and event boundary determination 430, each of which is described in greater detail below. The output of video event segmentation 310 is a segmented video event 435, which is stored in the video event store 280.

Shot Boundary Detection

The first step in segmenting is shot boundary detection 410 for discrete segments (or "shots") within a video. Shot boundaries are points of non-continuity in the video, e.g., associated with a change in a camera angle or scene. Shot boundaries may be determined by comparing color histograms of adjacent video frames and applying a threshold to that difference. Shot boundaries may be determined to exist wherever the difference in the color histograms of adjacent frames exceeds this threshold. Many techniques are known in the art for shot boundary detection. One exemplary algorithm is described in Tardini et al., *Shot Detection and Motion Analysis for Automatic MPEG-7 Annotation of Sports Videos,* 13th International Conference on Image Analysis and Processing (November 2005). Other techniques for shot boundary detection 410 may be used as well, such as using motion features. Another known technique is described in A. Jacobs, et al., *Automatic shot boundary detection combining color, edge, and motion features of adjacent frames*, Center for Computing Technologies, Bremen, Germany (2004).

Event Detection

Event detection 420 identifies the presence of an event in a stream of (one or more) segments using various features corresponding, for example, to the image, audio, and/or camera motion for a given segment. A classifier using such features may be optimized by hand or trained using machine learning techniques such as those implemented in the WEKA machine learning package described in Witten, I. and Frank, E., *Data Mining: Practical machine learning tools and techniques* (2nd Edition), Morgan Kaufmann, San Francisco, Calif. (June 2005). The event detection process 420 details may vary by domain.

Image features are features generated from individual frames within a video. They include low level and higher level features based on those pixel values. Image features include, but are not limited to, color distributions, texture measurements, entropy, motion, detection of lines, detection of faces, presence of all black frames, graphics detection, aspect ratio, and shot boundaries.

Speech and audio features describe information extracted from the audio and closed captioning streams. Audio features are based on the presence of music, cheering, excited speech, silence, detection of volume change, presence/absence of closed captioning, etc. According to one embodiment, these features are detected using boosted decision trees. Classification operates on a sequence of overlapping frames (e.g., 30 ms overlap) extracted from the audio stream. For each frame, a feature vector is computed using Mel-frequency cepstral coefficients (MFCCs), as well as energy, the number of zero crossings, spectral entropy, and relative power between different frequency bands. The classifier is applied to each frame, producing a sequence of class labels. These labels are then smoothed using a dynamic programming cost minimization algorithm, similar to those used in hidden Markov models.

In addition to audio features, features may be extracted from the words or phrases spoken by narrators and/or announcers. From a domain specific ontology 257, a predetermined list of words and phrases is selected and the speech stream is monitored for the utterance of such terms. A feature vector representation is created in which the value of each element represents the number of times a specific word from the list was uttered. The presence of such terms in the feature vector correlates with the occurrence of an event associated with the predetermined list of words. For example, the uttering of the phrase “touchdown” is correlated with the occurrence of a touchdown in sports video.

Unlike image and audio features, camera motion features represent more precise information about the actions occurring in a video. The camera acts as a stand in for a viewer’s focus. As actions occur in a video, the camera moves to follow it; this camera motion thus mirrors the actions themselves, providing informative features for event identification. Like shot boundary detection, there are various methods for detecting the motion of the camera in a video (i.e., the amount it pans left to right, tilts up and down, and zooms in and out). One exemplary system is described in Bouthemy, P., et al., *A unified approach to shot change detection and camera motion characterization*, IEEE Trans. on Circuits and Systems for Video Technology, 9(7) (October 1999); this system computes the camera motion using the parameters of a two-dimensional affine model to fit every pair of sequential frames in a video. According to one embodiment, a 15-state first-order hidden Markov model is used, implemented with the Graphical Modeling Toolkit, and then the output of the Bouthemy is output into a stream of clustered characteristic camera motions (e.g., state 12 clusters together motions of zooming in fast while panning slightly left). Some domains may use different, or additional, methods of identifying events. For example, in American football, an additional factor may be scene classification. In scene classification, once a shot boundary is detected a scene classifier is used to determine whether that shot is primarily focused on a particular scene, e.g., a playing field. Individual frames (called key frames) are selected from within the shot boundaries and represented as a vector of low level features that describe the key frame’s color distribution, entropy, motion, etc. A shot is determined to be of a particular scene if a majority of the sampled frames is classified as that scene.

Event Boundary Determination

Once a segment of video is determined to contain the occurrence of an event, the beginning and ending boundaries of that event must be determined 430. In some cases, the shot boundaries determined in 410 are estimates of the beginning and end of an event. The estimates can be improved as well by exploiting additional features of the video and audio streams to further refine the boundaries of video segments. Event boundary determination 430 may be performed using a classifier that may be optimized by hand or using supervised learning techniques. The classifier may make decisions based on a set of rules applied to a feature vector representation of the data. The features used to represent video overlap with those used in the previous processes. Events have beginning and end points (or offsets), and those boundaries may be determined based on the presence/absence of black frames, shot boundaries, aspect ratio changes, etc., and have a confidence measure associated with the segmentation. The result of event boundary determination 430 (concluding video event segmentation 410) is a (set of) segmented video event 435 that is stored in the video event store 280.

Metadata Alignment/Annotation

Figure 5:
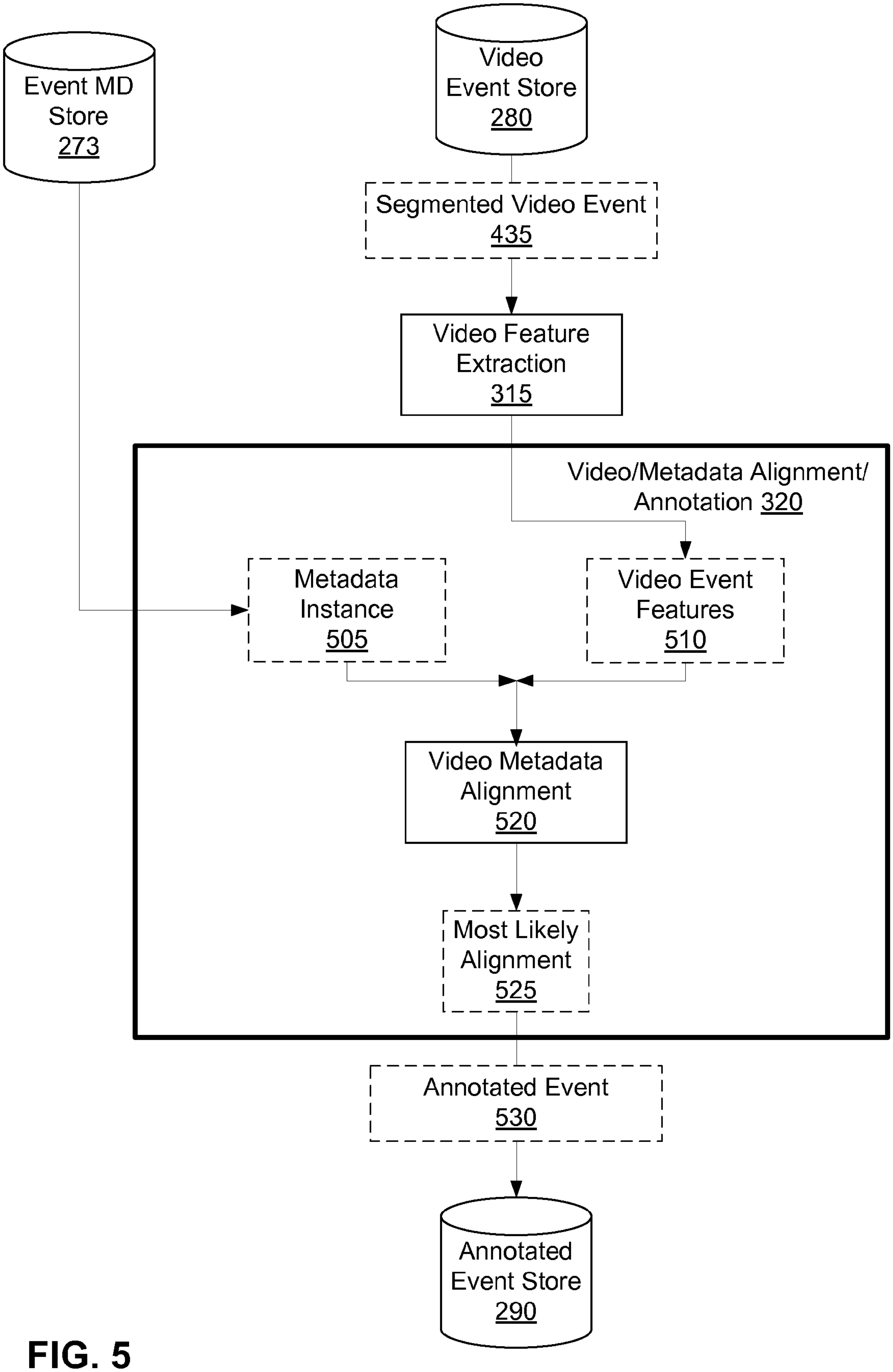
FIG. 5 is a flow diagram illustrating one embodiment of a metadata alignment/annotation process.

FIG. 5 is a flow diagram illustrating one embodiment of a metadata alignment/annotation 320 process. As described in FIG. 3A, the metadata alignment/annotation 320 process produces annotations of the segments from video event segmentation 310, which annotations include semantically meaningful information regarding the event or topic that the segment is about. Metadata alignment/annotation 320 includes two steps: event feature extraction 315 and video metadata alignment 520.

Video Feature Extraction

For any given video event that is to be aligned with metadata, the first step is to convert the video event into a feature vector representation via feature extraction 315. The feature extraction engine 225 is one means for performing this function. Input to the process is a segmented video event 435 retrieved from the video event store 280. Output from the video feature extraction 315 is a video event feature representation 510. The features may be identical to (or a subset of) the image/audio properties discussed above for video events and stored in the event metadata store 273, and may vary by domain.

Video Metadata Alignment

Video metadata alignment 520 takes as input the feature vector representation 510 of an event and a metadata instance 505, defined above as metadata corresponding to a single event. The metadata alignment engine 230 is one means for performing this function. It cycles through each metadata instance 505 in the event metadata store 273 and uses an alignment function to estimate the likelihood that a particular event may be described by a particular metadata instance for an event. As described above, metadata instances may include automatic annotations of low level content features (e.g., image or audio features), hand annotations of text descriptions, or both. For domains in which the metadata includes low level features, the alignment function may be a simple cosign similarity function that compares the feature representation 510 of the event to the low level properties described in the metadata instance 505. For domains in which metadata instances do not include automatic annotations of low level features, the video metadata alignment 520 method may employ a model which encodes relationships between low level features and descriptive text. One exemplary model is described in Fleischman, M. and Roy, D., *Grounded Language Modeling for Automatic Speech Recognition of Sports Video*, Proceedings of the Association of Computational Linguistics (ACL), Columbus, Ohio, pp. 121-129 (June 2008). This method uses grounded language models that link visual and text features extracted from a video to the metadata terms used to describe an event. For the purposes of this example, grounded language models can be manually estimated based on the visual and text features used for event segmentation, from which the following equation describes the likelihood that any particular metadata annotation describes a particular video event:

$$p\left(\text{metadata}\,|Vid\right) = \prod_{w \in metadata} \sum_{v \in Vid} p(w|v)$$

The grounded language model is used to calculate the probability that each video event found is associated with each human generated metadata annotation.

When all metadata instances 505 in the event metadata store 273 corresponding to the event have been examined, if the most likely alignment 525 (i.e., alignment with the highest probability or score) passes a threshold, the video event associated with the feature representation 510 is annotated with the metadata instance 505 and the resulting annotated event 530 is stored in an annotated event store 290 along with a score describing the confidence of the annotation. If no event passes the threshold, the event is marked as not annotated. In order to set this threshold, a set of results from the process is hand annotated into two categories: correct and incorrect results. Cross-validation may then be used to find the threshold that maximizes the precision/recall of the system over the manually annotated result set.

Social Media/Event Alignment

Figure 6:
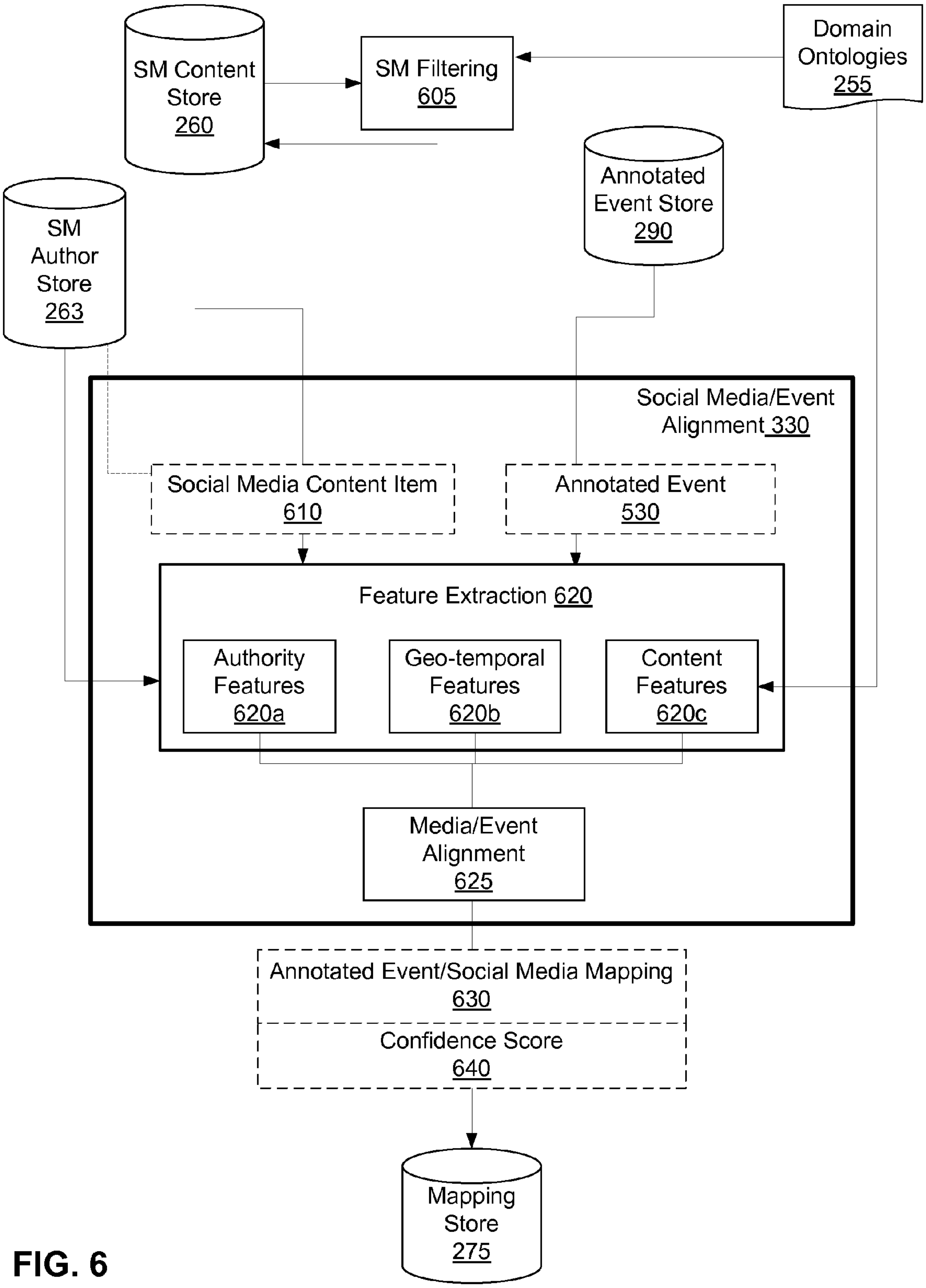
FIG. 6 is a flow diagram illustrating one embodiment of a social media/event alignment process.

FIG. 6 is a flow diagram illustrating one embodiment of a social media/event alignment 330 process. Social media/event alignment 330 associates (maps) the annotated time-based media event segments with social media content items and references to the events therein.

Filtering

As an initial and optional step, social media filtering step 605 occurs; the domain ontologies 257 are one means for performing this function. Social media content items are filtered in order to create a set of candidate content items with a high likelihood that they are relevant to a specific event. Content items can be relevant to an event by including a reference to the event.

In this optional step, before social media content items are integrated with video events, a candidate set of content items is compiled based on the likelihood that those posts are relevant to the events, for example, by including at least one reference to a specific event. The comparative feature extraction engine 240 is one means for performing this function. At the simplest, this candidate set of content items can be the result of filtering 605 associated with a given time frame of the event in question. Temporal filters often are far too general, as many content items will only coincidentally co-occur in time with a given event. In addition, for broadcast television, e.g., the increasing use of digital video recorders has broadened significantly the relevant timeframe for events.

Additional filters 605 are applied based on terms used in the content item's text content (e.g., actual texts or extracted text from closed caption or audio) that also appear in the metadata for an event and/or domain specific terms in the ontologies 257. For example, content item of a social network posting of "Touchdown Brady! Go Patriots" has a high probability that it refers to an event in a Patriots football game due to the use of the player name, team name, and play name, and this content item would be relevant to the event. In another example, a content item of a post that "I love that Walmart commercial" has a high probability that it refers to an advertisement event for Walmart due to the use of the store name, and the term "commercial," and thus would likewise be relevant to this event. To perform this type of filtering, terms are used from the metadata of an event as well as those domain-specific terms stored in ontology 257.

A social media content item can be relevant to an event without necessarily including a direct textual reference to the event. Various information retrieval and scoring methods can be applied to the content items to determine relevancy, based on set-theoretic (e.g., Boolean search), algebraic (e.g., vector space models, neural networks, latent semantic analysis), or probabilistic models (e.g., binary independence, or language models), and the like.

Social media content items that do not pass certain of these initial filters, e.g., temporal or content filters, are removed from further processing, reducing the number of mappings that occur in the latter steps. The output of social media filtering 605 is an updated social media content store 260, which indicates, for each content item, whether that content item was filtered by temporal or content filters. Additional filters may apply in additional domains.

Alignment/Mapping

Social media/annotated event alignment 330 includes a feature extraction process 620 and an alignment function 625. The feature extraction process 620 converts input of an annotated event 530 and a social media content item 610 into a feature vector representation, which is then input to the alignment function 625. The feature extraction process 620 also may receive input from the social media author store 263 and the domain ontologies 257. The three major types of features extracted in this process 620 are content features 620*c*, geo-temporal features 620*b*, and authority features 620*a*. The comparative feature extraction engine 240 is one means for performing this function, which identifies a relationship between the event features and social media features. The relationship may be co-occurrence, correlation, or other relationships as described herein.

Content features 620*c* refer to co-occurring information within the content of the social media content items and the metadata for the video events, e.g., terms that exist both in the content item and in the metadata for the video event. Domain ontologies 257 may be used to expand the set of terms used when generating content features.

Geo-temporal features 620*b* refer to the difference in location and time at which the input media was generated from a location associated with the social media content item about the event. Such information is useful as the relevance of social media to an event is often inversely correlated with the distance from the event (in time and space) that the media was produced. In other words, social media relevant to an event is often produced during or soon after that event, and sometimes by people at or near the event (e.g., a sporting event) or exposed to it (e.g., within broadcast area for television-based event).

For video events, geo-temporal information can be determined based on the location and/or time zone of the event or broadcast of the event, the time it started, the offset in the video that the start of the event is determined, the channel on which it was broadcast. For social media, geo-temporal information can be part of the content of the media itself (e.g., a time stamp on a blog entry or status update) or as metadata of the media or its author.

The temporal features describe the difference in time between when the social media content item was created from the time that the event itself took place. In general, smaller differences in time of production are indicative of more confident alignments. Such differences can be passed through a sigmoid function such that as the difference in time increases, the probability of alignment decreases, but plateaus at a certain point. The parameters of this function may be tuned based on an annotated verification data set. The spatial features describe the distance from the author of the content item location relative to the geographical area of the event or broadcast. Spatial differences are less indicative because often times people comment on events that take place far from their location. A sigmoid function may be used to model this relationship as well, although parameters are tuned based on different held out data.

Authority features 620*a* describe information related to the author of the social media and help to increase the confidence that a social media content item refers to a video event. The probability that any ambiguous post refers to a particular event is dependent upon the prior probability that the author would post about a similar type of event (e.g., a basketball game for an author who has posted content about prior basketball games). The prior probability can be approximated based on a number of features including: the author's self-generated user profile (e.g., mentions of a brand, team, etc.), the author's previous content items (e.g., about similar or related events), and the author's friends (e.g., their content contributions, profiles, etc.). These prior probability features may be used as features for the mapping function.

The alignment function 625 takes the set of extracted features 620*a-c* and outputs a mapping 630 and a confidence score 640 representing the confidence that the social media content item refers to the video event. The media/event alignment engine 245 is one means for performing this function. For each feature type 620*a-c*, a feature specific sub-function generates a score indicating whether the social media content item refers to the annotated event. Each sub-function's score is based only on the information extracted in that particular feature set. The scores for each sub-function may then be combined using a weighted sum, in order to output a mapping 630 and an associated confidence score 640, as shown below for an event x and a social media content item y:

$$\text{align}(\text{feat}(x,y))=[\alpha\cdot\text{content}(\text{feat}(x,y))]+[\beta\cdot\text{geoTemp}(\text{feat}(x,y))]+[\gamma\cdot\text{author}(\text{feat}(x,y))]$$

where α, β, and γ are the respective weights applied to the three feature types, and align(feat(x,y)) is the confidence score. Both the weights in the weighted sum, as well as the sub-functions themselves may be trained using supervised learning methods, or optimized by hand. The output of the social media/event alignment function 330 is a mapping between an annotated event and a social media content item. This mapping, along with the real-value confidence score is stored in the mapping store 275.

Social Interest Estimation

Figure 7:
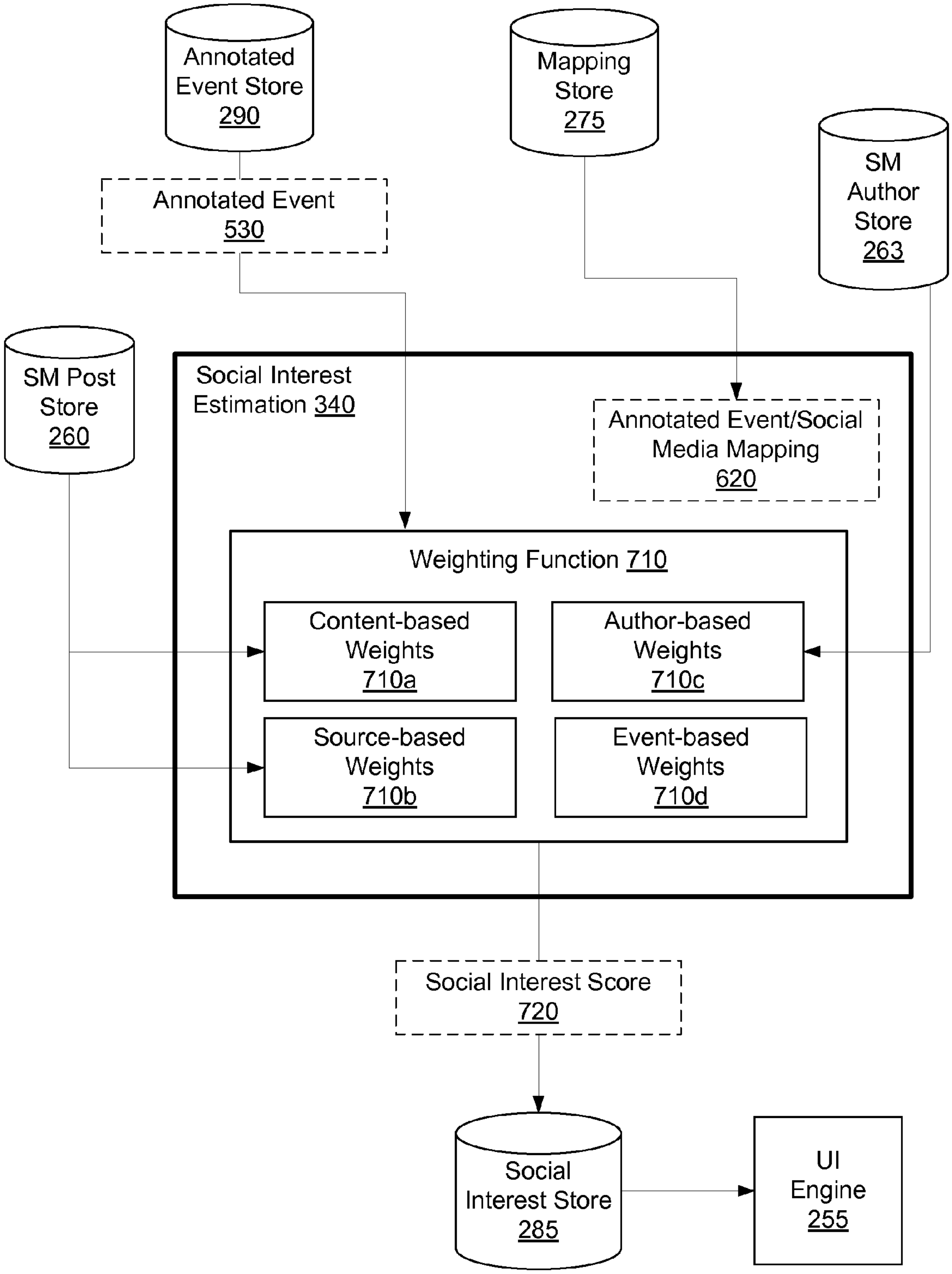
FIG. 7 is a flow diagram illustrating one embodiment of a social interest estimation process.

FIG. 7 is a flow diagram illustrating one embodiment of a social interest estimation process 340. Social interest in an event may be estimated by aggregating the information gleaned from the video event segmentation 310, video metadata alignment 320, and social media/event alignment 330 processes. The social interest estimator 250 is one means for performing this function.

Input to the social interest estimation process 340 includes an annotated event 530 retrieved from the annotated event store 290 and an annotated event/social media mapping 620 retrieved from the mapping store 275. In addition, data from the social media content store 260 and social media author store 263 may be used for the weighting function 710.

For each of the media types, social interest is estimated based on a weighted count of references to particular events in each social media content item. Social media content items relevant to an event are indicative of interest, and by discovering and aggregating such content items and references to events therein, a social interest score is generated that represents the level of social interest of the event based on the aggregated content items.

For a particular event, the social interest estimation process 340 includes the computation of a weighted sum over all social media content items that include at least one reference to an event. The computation proceeds by cycling through all social media content items that refer to that event (as determined in the social media/annotated event alignment 330 process). For each item aligned to that event the social interest score for that event is incremented by a weighted value based on the metadata of the content item. Thus, the output social interest score 720 can be thought of as an aggregate score aggregated across the confidence scores 640 for each event.

These weights typically can be set from zero to one depending on the configuration of the system. The weights are multiplicative, and are based on various factors described below: as social media content weights 710*a*, source-based weights 710*b*, author-based weights 710*c*, and/or event-based weights 710*d*.

Social media content weights 710*a* can be used in the social interest estimation process 340 based on, for example, the sentiment of the media that mention it. For example, scores can be weighted such that interest is computed based only on posts that describe positive sentiment toward an event (i.e., only posts from authors who expressed positive sentiment toward the event are incorporated in the weighted sum). The sentiment expressed in a social media content item may be automatically identified using a number of techniques. Exemplary techniques are described in B. Pang and L. Lee, *Opinion Mining and Sentiment Analysis*, Foundations and Trends in Information Retrieval 2(1-2), pp. 1-135 (2008).

Source-based weights 710*b* can be used in the social interest estimation process 340 based on how (e.g., in what form) an event is mentioned. Some sources may be given higher weight if they are determined to be more influential as measured by, for example, the size of their audience (as estimated, for example, by QuantCast Corporation, San Francisco, Calif.) or the number of inbound links to the source site. Further, certain sources may be given higher weight in order to generate social interest scores for specific communities of users. For example, a social interest score may be computed based on only social media content items generated by sources of a particular political leaning (e.g., Republican or Democrat) by setting the weights to zero of all content items with sources that are not predetermined to be of that particular political leaning (e.g., where the political leaning of a source is determined by a human expert or a trained machine classifier).

Author-based weights 710*c* can be used in the social interest estimation process 340 to bias the social interest estimate toward specific communities of users. For example, the estimate of social interest may be biased based on demographic information about the author of the post, such that, for example, only posts that were generated by men older than 25 years old are given weight greater than zero. Determination of such demographic information may come from an examination of publicly available data posted by the author themselves, by human annotation of specific authors based on expert opinion, or by machine classifiers trained on human labeled examples. In the sports context, estimate of social interest can be weighted toward only fans of the home team by filtering posts based on their location of origin (i.e. only posts from authors in the home team's city are incorporated in the weighted sum) or previous history of posts (i.e. the author has a history of posting positive remarks about the home team).

Event-based weights 710*d* can be used in the social interest estimation process 340 based on evidence of social interest within the time-based media stream itself. Examples of such media include, but are not limited to, series television shows, and broadcast sports games. In such time-based media, multiple features exist that provide information useful for estimating social interest. Examples of this include, but are not limited to, visual analysis (e.g., looking for specific events, such as explosions), audio analysis (e.g., identification of high energy sound events, such as excited speech), natural language analysis (e.g. identification of key terms and phrases, such as "home run"), and video event analysis (e.g., evaluation of replayed events such as those shown at the beginning of series television shows or intermittently in sports broadcasts such as an instant replay in a sporting event). Weights based on such events themselves are predetermined using analysis of human labeled examples.

Further, the social interest scores can be weighted based on the behaviors of viewers of the time-based media, as stored in the usage statistics 265. Such user behavior is integrated based upon the timing of user content items relative to media and presentation times of the events (e.g., how often a particular event was replayed). Analysis of these behaviors across multiple users can be indicative of social interest, for example, when the same section of media is paused and reviewed multiple times (by multiple people). Other recordable user behavior from the usage statistics 265 that can be used for the social interest estimation process 340 includes, but is not limited to, viewing times, dwell times, click through rates for advertisements, search queries, sharing behavior, etc.

The output of the social interest estimation process 340 is a social interest score 720 that is stored in the social interest store 285. The social interest score 720 may be used to provide information for a user interface, e.g., as described in the displays depicted herein, via user interface engine 255, which is one means for performing this function.

To further illustrate the methods for associating social media content items with time-based media events, and for determining social interest in the events based on the resulting associations, two examples follow in the domains of American football and commercial advertising.

Example

American Football

As described in conjunction with FIG. 3A, multiples streams of data are ingested as a preliminary step in the method. For the football domain, in addition to the data discussed in FIG. 3, an additional source of data comes from statistical feeds that contain detailed metadata about events (with text descriptions of those events) in a football game. Statistical feed are available from multiple sources such as the NFL's Game Statistics and Information System and private companies such as Stats, Inc.

Video Event Segmentation

In the video event segmentation 310 process for American football, the time-based media, e.g., a television feed for a football game, is segmented into semantically meaningful segments corresponding to discrete "events" that include plays in a game (and advertisements in between).

The first step in segmenting events in a football video is to detect the shot boundaries of a video. Shot boundaries are points in a video of non-continuity, often associated with the changing of a camera angle or a scene. In the domain of American football, changes in camera angles are typically indicative of changes in plays.

In the football domain, event detection 420 may operate by first identifying shots that depict the football field. Once a shot boundary is detected, a scene classifier is used to determine whether that shot is primarily focused on the playing field. Field shots may then be further classified as depicting a game event (i.e. a play). In the football domain, during event boundary determination 430 the beginning and end points (i.e., in/out points) of an event may be refined to reflect more appropriate start and stop points of a play. Such in/out points may be adjusted based on clock characterization, and/or utterance segmentation. In a professional football game, the beginning and end of a play is sometimes (but not always) associated with the starting or stopping of the play clock. This play clock is often shown as a graphic overlay in a broadcast football game. The starting/stopping of this play clock can be determined by monitoring the amount of change (in pixels) of a frame sub-region (i.e., the region containing the play clock graphic) in the video over time. When the aggregate change in such sub-regions falls below a threshold for greater than one second, the state of the play-clock is assumed to be "inactive." If the aggregate change goes above a threshold, the state of the play-clock is assumed to be "active." Changes in the state of the play-clock are strong indicators that an event has either begun or ended in the video.

Aesthetic judgment is often required when determining boundaries for the precise start and end points of a play. Approximating such judgments can be accomplished using the utterance boundaries in the speech of the game announcers. These utterances boundaries can be detected by identifying pauses in the stream of speech in the video. Pauses can be identified using audio processing software, such as is found in Sphinx 3.

Thus, the output of video event segmentation 310 for an American football game on television is a set of segmented video events corresponding to plays in a game.

Video Metadata Alignment/Annotation

The process of metadata alignment/annotation 320 in American football operates on the video stream segmented into events based on plays in the game. These events are annotated with metadata concerning the type of event shown (e.g. "touchdown"), key players in those events (e.g. "Tom Brady"), the roles of those players (e.g. "Passer"), and, details of the event (e.g. "number of yards gained"). This metadata can be added manually by human experts, fully automatically by a machine algorithm, or semi-automatically using a human-machine hybrid approach. Metadata is stored in the event metadata store 273.

For each event (i.e., play) that is to be aligned with metadata, the play is converted into a feature vector representation via feature extraction 315. Video metadata alignment 520 then takes as input the feature vector representation 510 of a single play and a metadata instance 505. It cycles through each metadata instance 505 in the event metadata store 273 and estimates the likelihood that the particular play may be described by a particular metadata instance using, for example, a probabilistic model. One exemplary model is the grounded language model described above.

Social Media/Annotated Event Alignment

In social media/annotated event alignment 330, feature extraction 620 generates geo-temporal features, content features, and authority features. Content feature representations express the amount of correlated content between event metadata and terms within social media content items. For example, the content item "Touchdown Brady! Go Patriots," and the annotation "passer: Brady, event: touchdown, receiver: Moss" have overlapping content terms (i.e., "touchdown" and "Brady").

In addition to exact matches, the domain ontology 257 of football terms is used to expand the term set to include synonyms and hypernyms (e.g., "TD" or "score" for "touchdown"), as well as nicknames for players (e.g. "Tom Terrific" for "Brady").

Authority feature representations express the prior probability that any author of social media content may be referring to a football event. One factor in the estimation of this probability may be based on the friends, followers, or other connections to a user in their social network. Such connections are indicative of an author's likelihood to post about a football event, which can provide additional features for the social media/event alignment 330 function. The more friends someone keeps who post about football events, the more likely they will post about football events. To capture this information, meta-scores are generated for a user based on the frequency that their contacts have posted about football events. The meta-scores are the average, mode, and median of all of the frequency of their friends' football posts.

The output of social media/event alignment 330 is a mapping between the annotated play and each social media content item, with an associated confidence score.

If information about the social interest in the play is desired, it may be estimated by aggregating the information gleaned from the above processes. The social interest estimation 340 may be calculated for every play in the game. The likely result is higher social interest scores for plays such as touchdowns, and lower social interest scores for lesser plays.

Example

Advertising

As described in conjunction with FIG. 3A, multiples streams of data are ingested as a preliminary step in the method.

Video Event Segmentation

For the advertising domain, during the video event segmentation 310 process, the time-based media is segmented into semantically meaningful segments corresponding to discrete "events" which are identified with advertisements (i.e. commercials).

Event detection 420 in the advertising domain may operate by identifying one or more shots that may be part of an advertising block (i.e. a sequence of commercials within or between shows). Advertising blocks are detected using image features such as the presence of all black frames, graphics detection (e.g. presence of a channel logo in the frame), aspect ratio, shot boundaries. Speech/audio features may be used including detection of volume change, and the presence/absence of closed captioning.

Event boundary detection 430 operates on an advertisement block and identifies the beginning and ending boundaries of individual ads within the block. Event boundary determination may be performed using a classifier based on features such as the presence/absence of black frames, shot boundaries, aspect ratio changes. Classifiers may be optimized by hand or using machine learning techniques.

Video Metadata Alignment/Annotation

As with event segmentation 310, the video metadata alignment/annotation 320 process is domain dependent. In the advertisement domain, metadata for an advertisement may include information such as "Brand: Walmart, Scene: father dresses up as clown, Mood: comic." This metadata is generated by human annotators who watch sample ad events and log metadata for ads, including, the key products/brands involved in the ad, the mood of the ad, the story/creative aspects of the ad, the actors/celebrities in the ad, etc.

Metadata for advertisements may also include low level image and audio properties of the ad (e.g. number and length of shots, average color histograms of each shot, power levels of the audio, etc.).

For each event (i.e., advertisement) that is to be aligned with metadata, the advertisement is converted into a feature vector representation via feature extraction 315. Video metadata alignment 520 then takes as input the feature vector representation 510 of a single advertisement and a metadata instance 505. It cycles through each metadata instance 505 in the event metadata store 273 and estimates the likelihood that the particular advertisement may be described by a particular metadata instance using, for example, a simple cosign similarity function that compares the low level feature representation of the ad event to the low level properties in the metadata.

Social Media/Annotated Event Alignment

In social media/annotated event alignment 330, feature extraction E.g., generates geo-temporal features, content features, and authority features. Content feature representations express the amount of co-occurring content between event metadata and terms within social media content items. For example, the content item "I loved that hilarious Walmart clown commercial" and the annotation "Brand: Walmart, Scene: father dresses up as clown, Mood: comic" have co-occurring content terms (i.e., "Walmart" and "clown").

In addition to exact matches, the domain ontologies 257 that encode information relevant the advertising domain may be used to expand the term set to include synonyms and hypernyms (e.g., "hilarious" for "comic"), names of companies, products, stores, etc., as well as, advertisement associated words (e.g., "commercial").

The output of social media/event alignment 330 is a mapping between the annotated advertisement and each social media content item, with an associated confidence score.

If information about social interest in the advertisement is desired, it may be estimated by aggregating the information gleaned from the above processes. The social interest estimation 340 may be calculated for every advertisement in an advertising block or television show. The likely result is higher social interest scores for particularly interesting or funny advertisements, and lower social interest scores for less exciting or repetitive advertisements.

Although American football and advertising domains are described above, the methods described herein can be adapted to any domain using time-based media. The method of adaptation is general across different domains and focuses on two changes. First, techniques and features used for event segmentation and annotation are adapted to reflect domain specific characteristics. For example, detecting events in football exploits the visibility of grass as it is represented in the color distributions in a video frame, while detecting events in news video may exploit clues in the closed captioning stream and graphic overlays in the frames. The second change involves the ontology used to link events to social media content items which refer to them. While for football, the requisite ontology contains concepts related to football players, teams, and events, domains such as news video require ontologies with concepts related to germane concepts such as current events and culturally popular figures.

Display of Social Interest Estimation

Figure 8A:
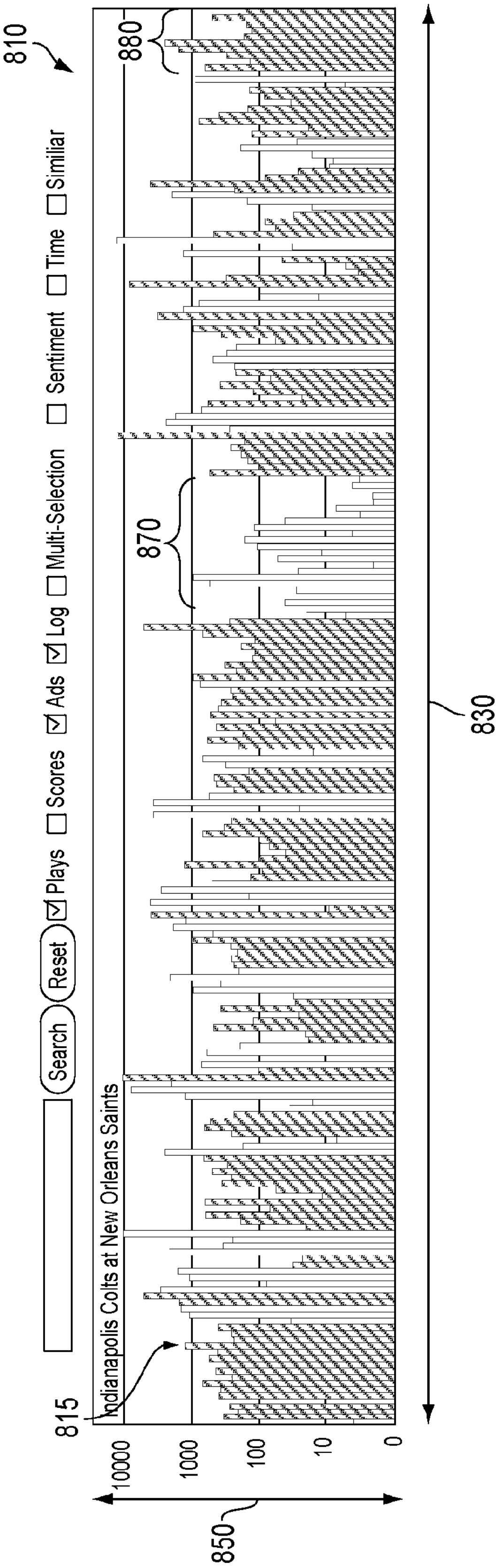
FIGS. 8A and 8B show two embodiments of social interest heat maps showing levels of social interest for a plurality of events corresponding to a series of chronological time segments in a time-based medium.
Figure 8B:
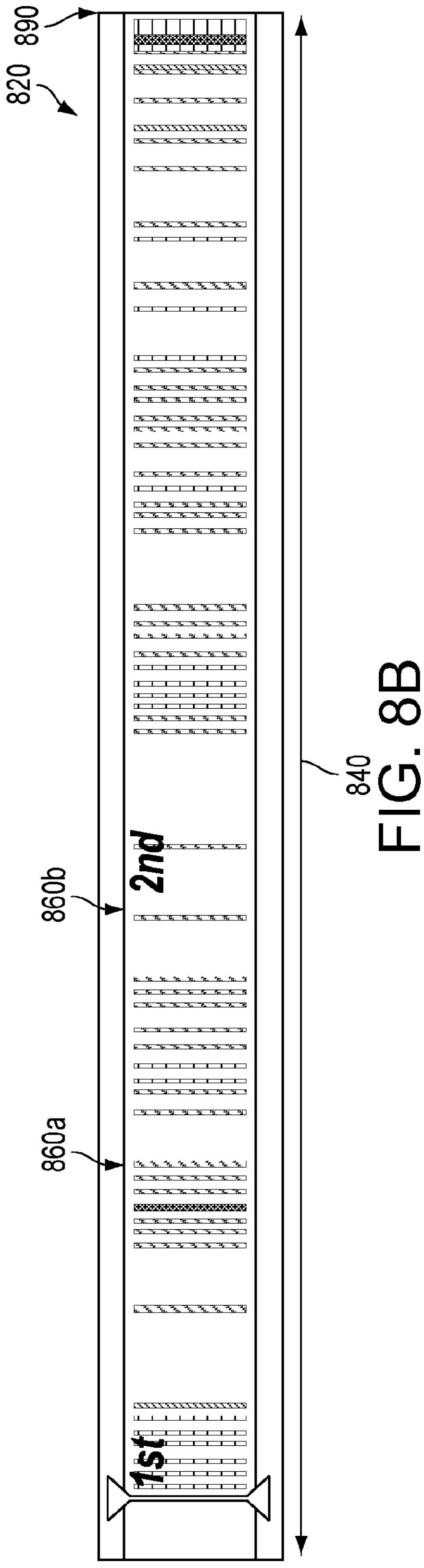

As mentioned above, the social interest estimations can be used in various ways. One such application is to display social interest in various user interfaces and graphic representations. FIGS. 8A and 8B show two embodiments of social interest heat maps 810, 820 showing levels of social interest for a plurality of events corresponding to a series of chronological time segments in a time-based medium.

FIG. 8A shows a social interest heat map 810 corresponding to a football game, in which individual events (plays and advertisements) 815 are shown as vertical bars chronologically across a timeline 830; the time location of a bar corresponds to the beginning point of the event. The level (height) of estimated social interest in each event 815 is shown vertically by number of social content items 850 corresponding to each event 815, with a taller bar representing greater social interest. Two event types, advertisements 870 and plays 880, are shown.

FIG. 8B shows a similar social interest heat map corresponding to a football game, in which individual events (plays and advertisements) 860 are shown chronologically across a timeline 840. The level of estimated social interest in each event 860 is shown by intensity of color of the corresponding bar 860, with a darker bar representing greater social interest. Other color/intensity/texture/pattern scales can be used to represent the level of interest. Two event types, advertisements 890 and plays 860, are shown.

FIGS. 13A-D show yet another embodiment of a user interface 1300 displaying social interest heat maps 1310 showing levels of social interest for a plurality of events corresponding to a series of chronological time segments in a time-based medium.

Figure 13A:
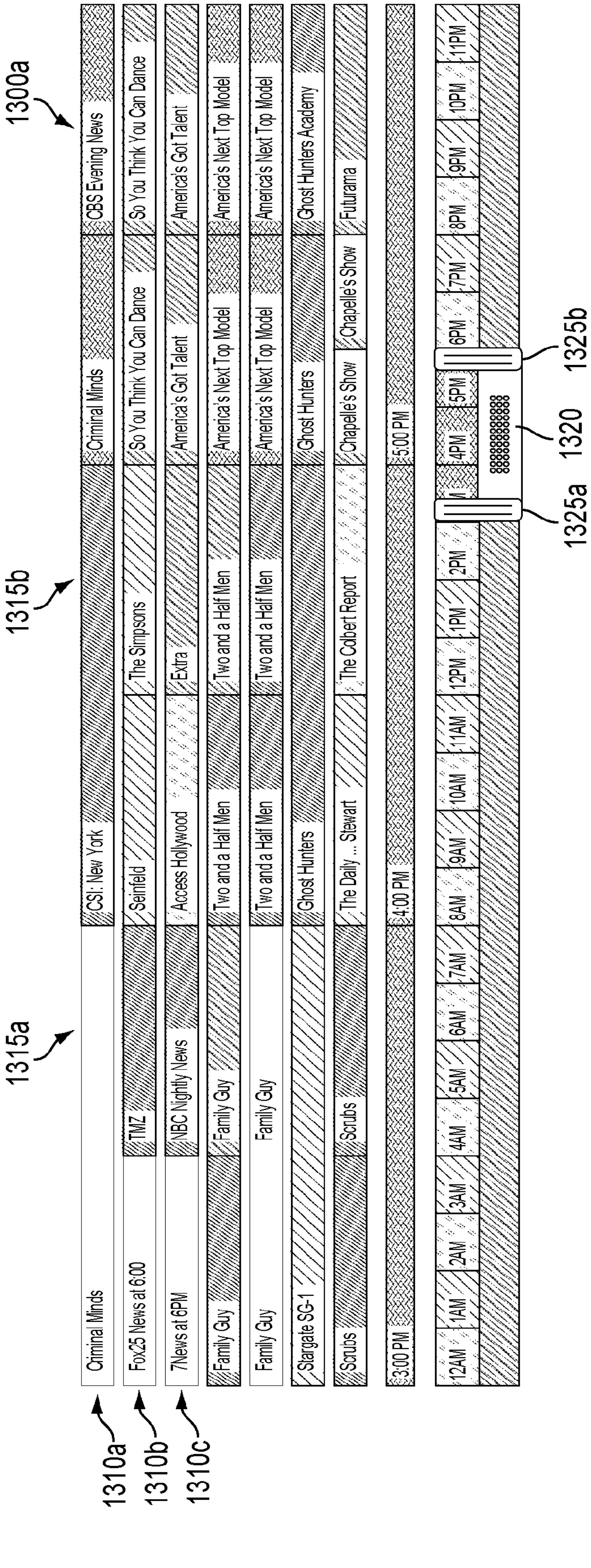
FIGS. 13A-D show yet another embodiment of a user interface displaying social interest heat maps showing levels of social interest for a plurality of events corresponding to a series of chronological time segments in a time-based medium.

FIG. 13A shows a user interface 1300*a* with each social interest heat map 1310 (horizontal bars) corresponding to a different channel. The width of the maps 1310 corresponds to a time period as show in the navigation bar 1320, between the two ends 1325. Channels have multiple distinct shows, shown as cells 1315, thereby forming a grid. The level of social interest is indicated by intensity of color in a given cell 1315, with the darkest cells indicative of the highest social interest in the show. The navigation bar 1320 allows the user to select the timeframe for viewing, and the ends 1325 allow the size of the navigation bar to be expanded to adjust the visible portion of the social interest heat maps in the user interface 1300, with the left end 1325*a* controlling the beginning time and the right end 1325*b* controlling the ending time for the social interest heat maps 1310.

Figure 13B:
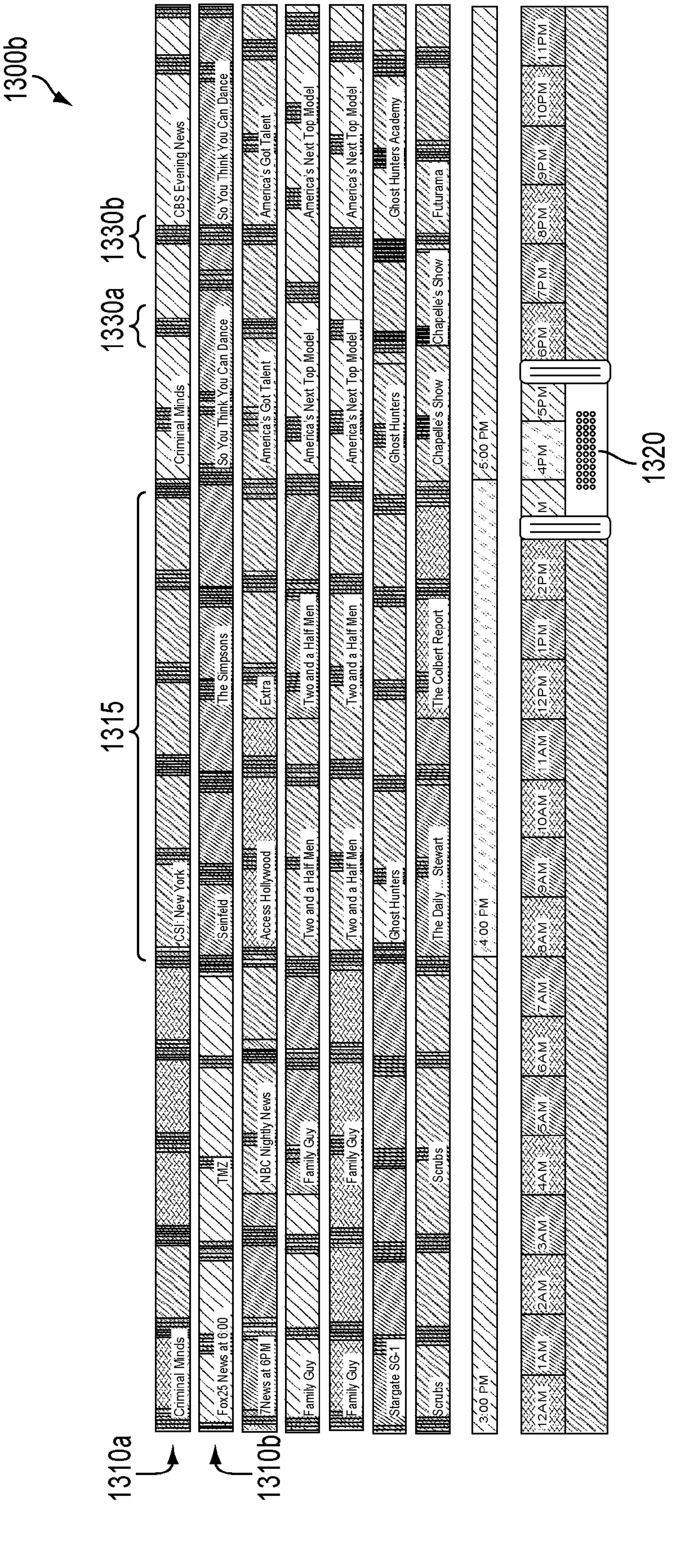

FIG. 13B shows a user interface 1300*b* similar to that shown in FIG. 13A, except that the social interest heat maps 1310 include indication of advertisements 1330 that appear during the shows 1315. The darkness of the lines corresponding to individual advertisements with the darkness as an indicator of social interest in the advertisements, with darker indicating greater interest.

Figure 13C:
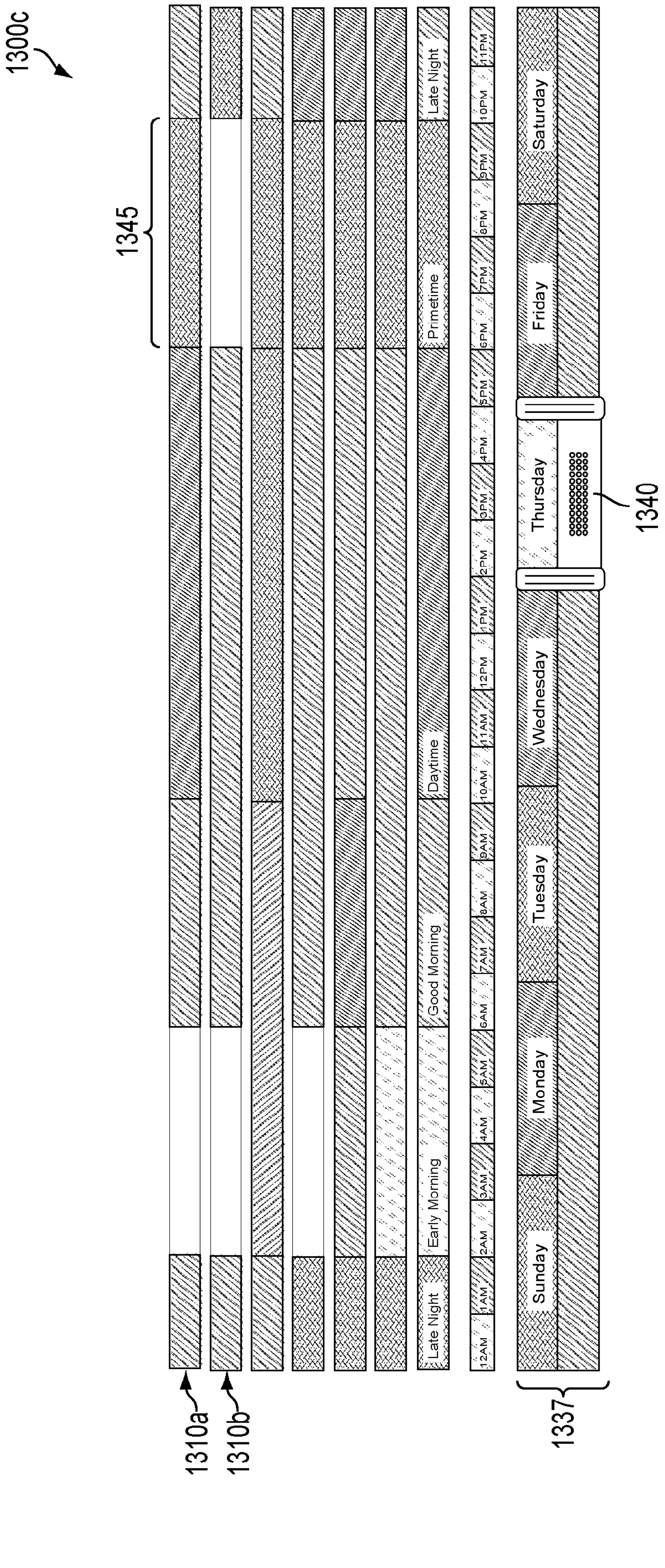

FIG. 13C shows a user interface 1300*c* similar to that shown in FIG. 13A, except that the social interest heat maps 1310 are zoomed out to the level of days to show a different time scale on the navigation bar 1337. Here, each division 1340 in the navigation bar corresponds to a single day. The cells 1345 correspond to times of day, e.g., Primetime. The darkness of color of each cell is representative of the social interest in shows and/or advertisements during that time frame.

Figure 13D:
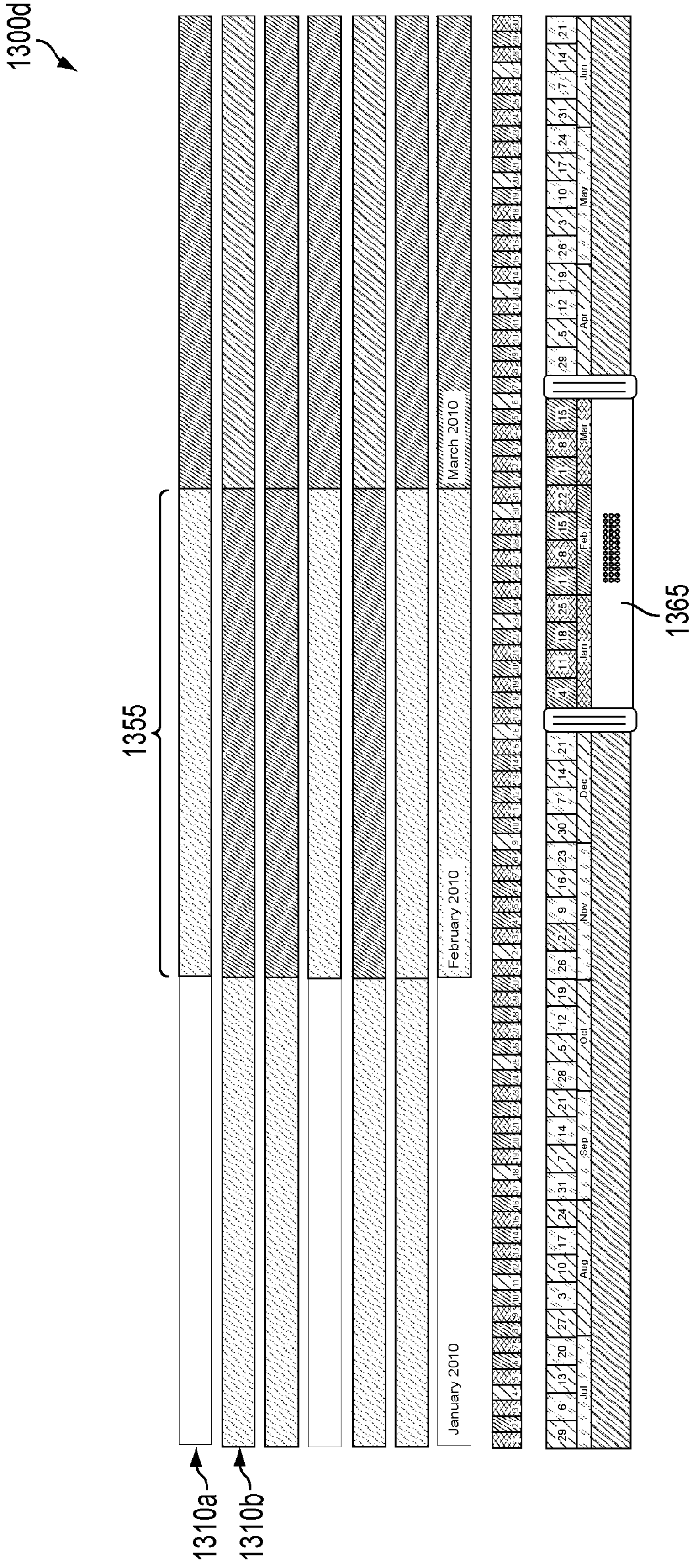

FIG. 13D shows a user interface 1300*d* similar to that shown in FIG. 13A, except that the social interest heat maps 1310 are zoomed out to the level of months to show a different time scale. The division 1365 in the navigation bar 1337 corresponds to a quarter of a year. The cells 1355 in the grid correspond to months of the year. The darkness of color of each cell is representative of the social interest in shows and/or advertisements during that time frame.

Figure 9A:
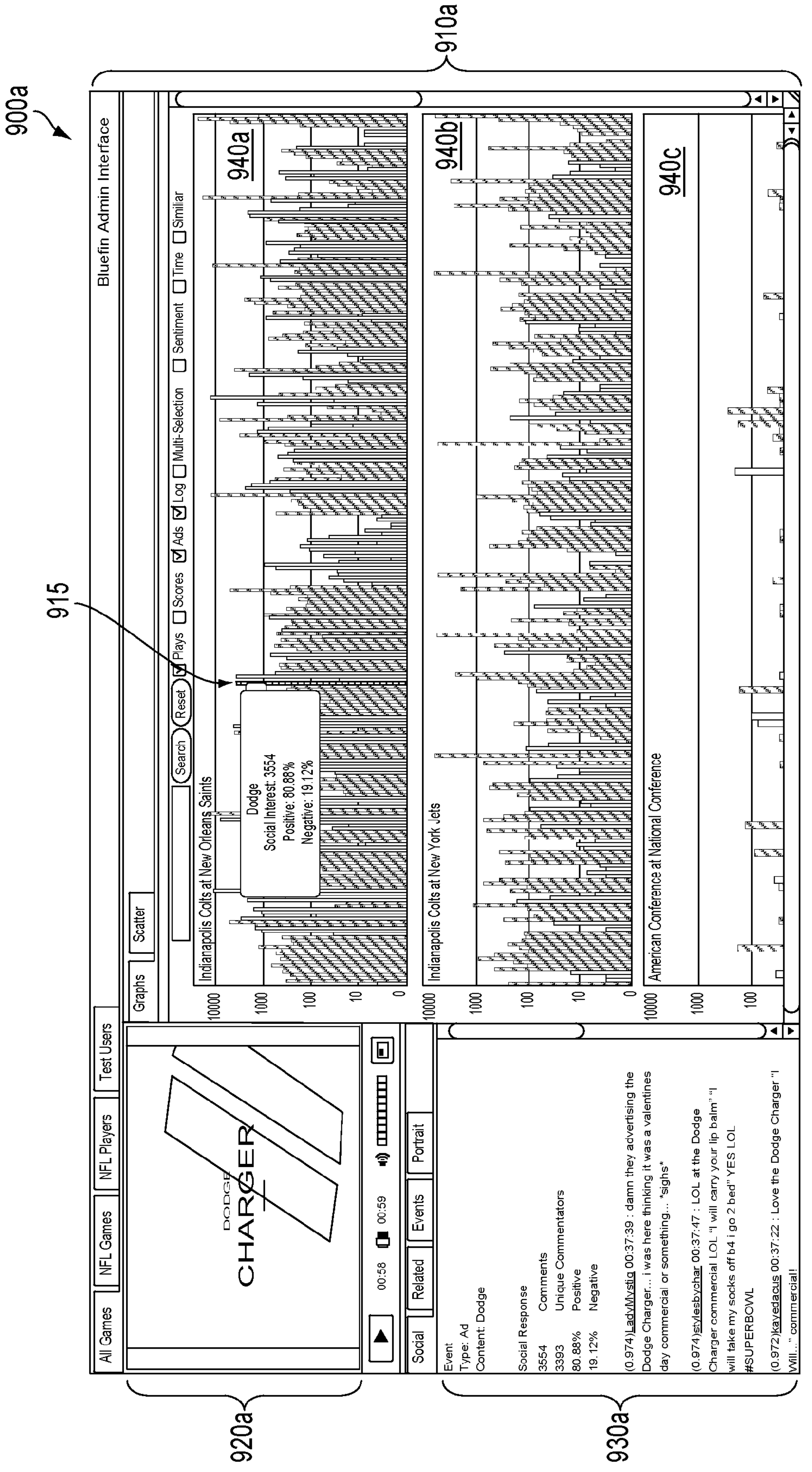
FIGS. 9A-9C show three embodiments of user interfaces of a social interest estimation system.
Figure 9B:
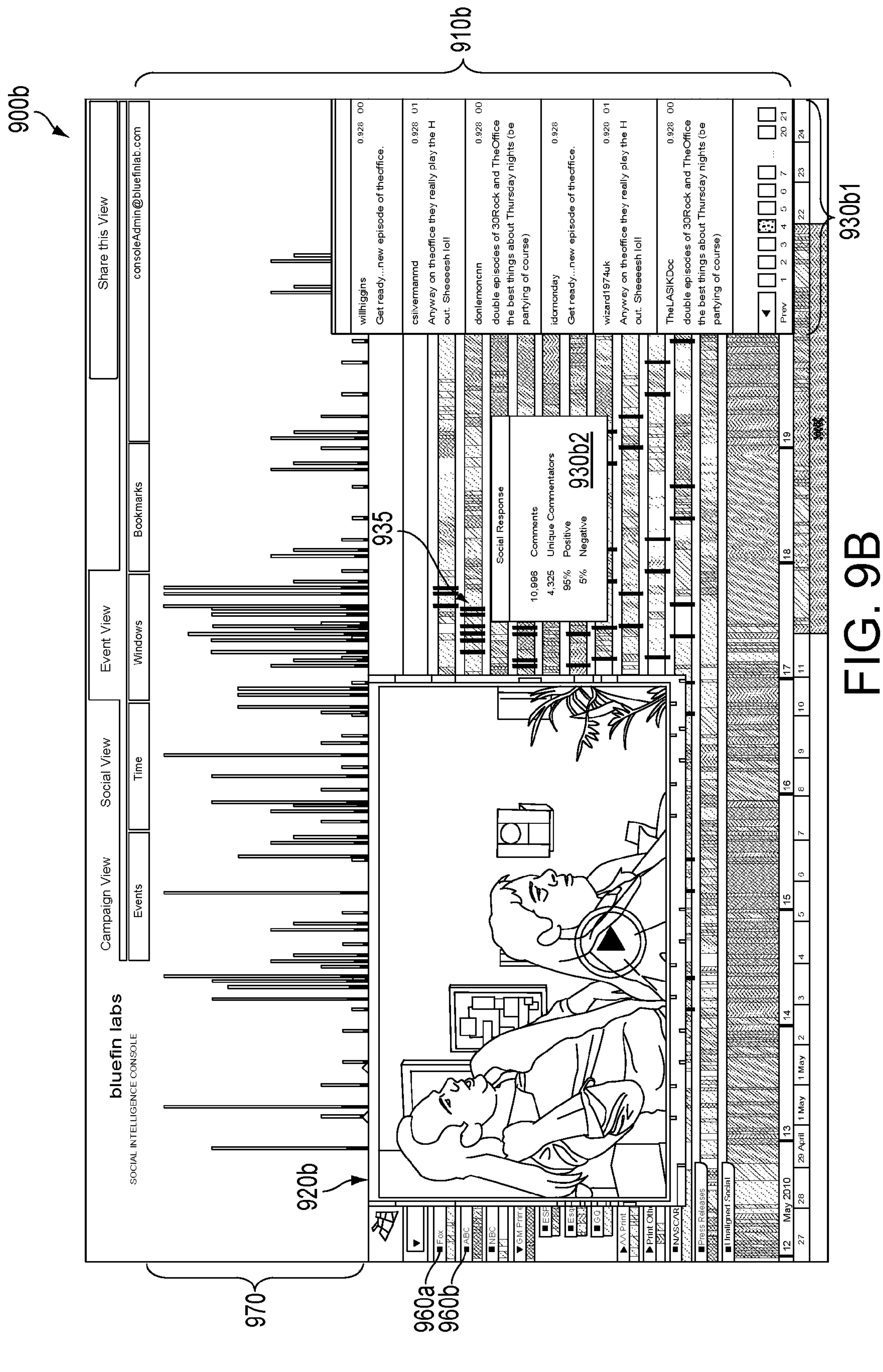
Figure 9C:
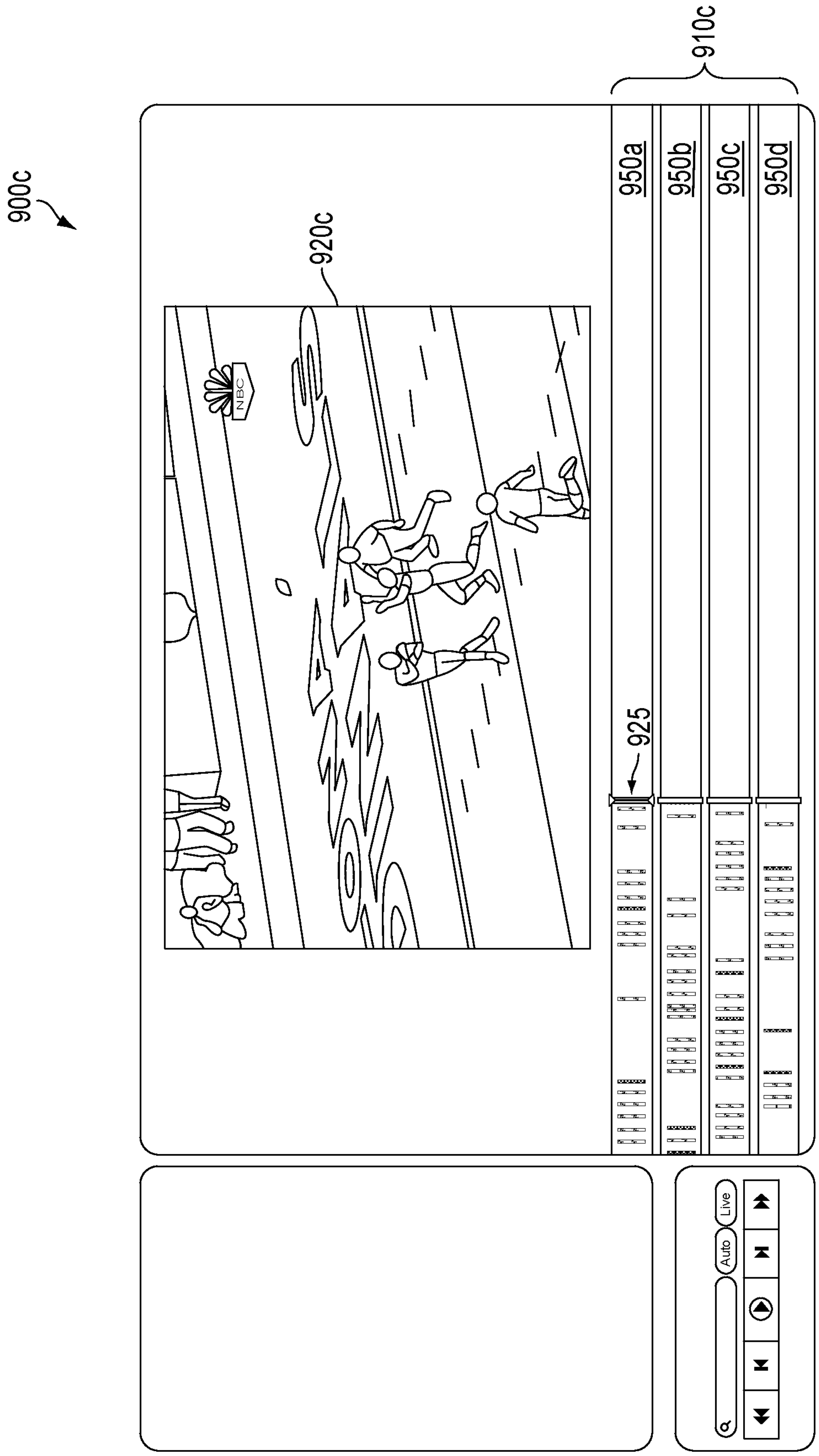

FIGS. 9A-9C show three embodiments of user interfaces 900 of a social interest estimation system. Each figure shows a social interest heat map area 910, media display area 920, and a social media display area 930 (not shown in 9C).

FIG. 9A shows in the social interest heat map area 910*a* three social interest heat maps 940*a-c* similar to the one described in conjunction with FIG. 8A, each map 940*a-c* corresponding to a different channel of media content. The media display area 920*a* shows a media player for displaying the time-based media associated with the selected event 915, in this example a Dodge Charger advertisement. The social media display area 930*a* shows statistical information about the social media corresponding to the selected event, as well as the individual social media content items.

FIG. 9B shows in the social interest heat map area 910*b* several social interest heat maps 960 similar to the one described in conjunction with FIG. 8B, each map 960 corresponding to a different channel, as well as an overall social interest heat map 970 corresponding to a selected event across all channels. The media display area 920*b* shows a media player for displaying the time-based media associated with a user selected event 935, in this example an advertisement scene. The user can select any event 935 in the display and invoke the player to show the video content of the event. The social media display areas 930*b*1 and 930*b*2 show the individual social media content items (930*b*1) and statistical information about the social media corresponding to the selected event (930*b*2).

FIG. 9C shows in the social interest heat map area 910*c* four social interest heat maps 950*a-d* similar to the one described in conjunction with FIG. 8B, each map 950*a-d* corresponding to a different channel. The media display area 920*c* shows a media player for displaying the time-based media associated with the selected event 925, in this example a pass in a football game. Again, the user can control the player to show an event by selecting the event 925 in a map 950.

Figure 10A:
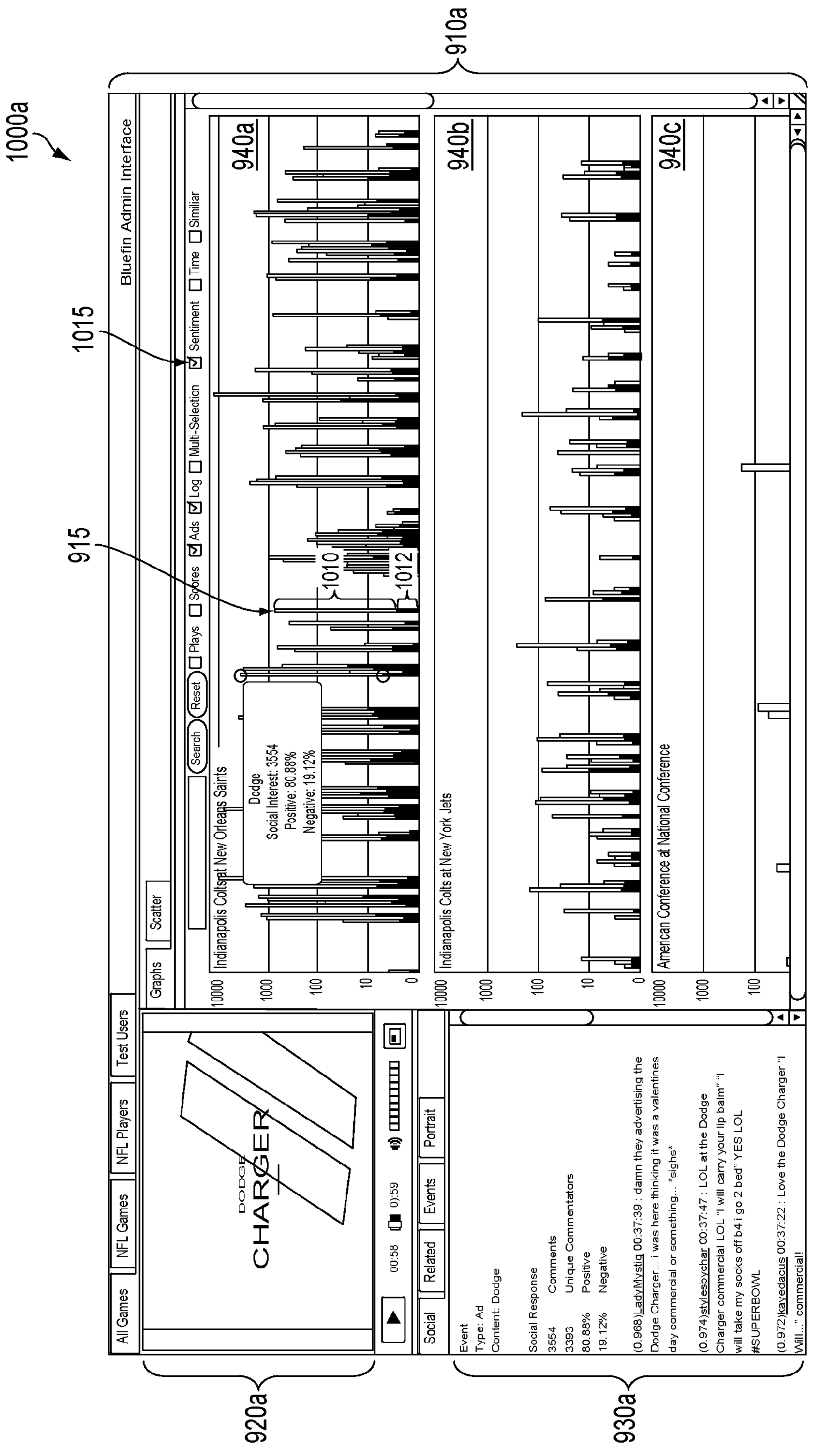
FIGS. 10A and 10B show two embodiments of user interfaces of a social interest estimation system showing a sentiment view.
Figure 10B:
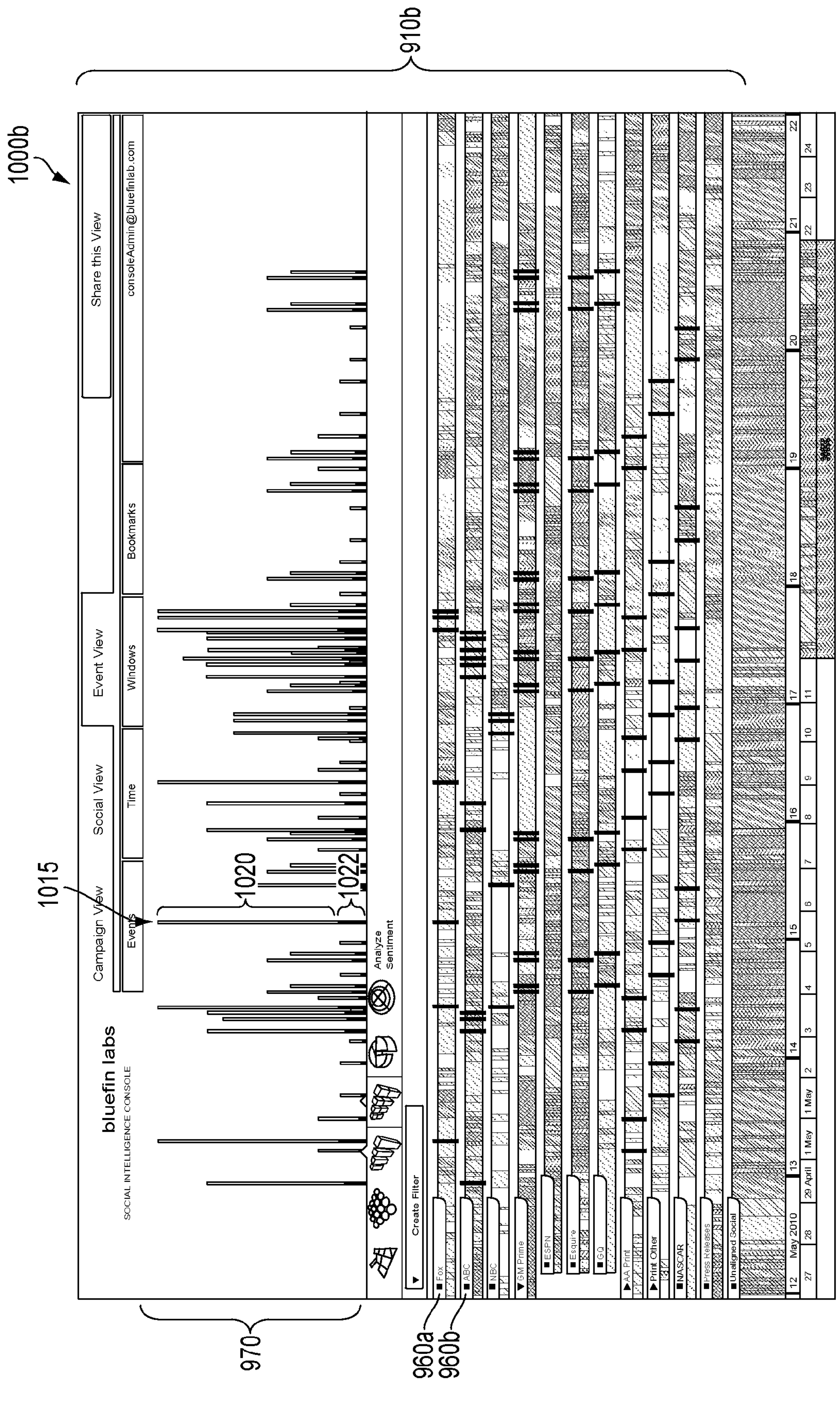

FIGS. 10A and 10B show two embodiments of user interfaces 1000 of a social interest estimation system showing a sentiment view. The user interfaces 1000 are similar to those shown in FIGS. 9A-9B, except that the social interest heat maps 940, 970 provide information indicating the sentiment of the social media content items, i.e., whether they are negative or positive, e.g., based on the sentiment detection process described herein.

FIG. 10A shows for the event 915 in the social interest heat maps 940, a (top) positive portion 1010 corresponding to the number of social media content items with positive sentiment, and a (bottom) negative portion 1012 corresponding to the number of social media content items with negative sentiment. The positive 1010 and negative 1012 portions are visually distinguished from each other, such that their relative percentages within the whole of the event bar is visible. A radio button 1015 is shown for toggling on and off the sentiment view.

FIG. 10B shows for an event 1015 in the overall social interest heat map 970, a (top) positive portion 1020 corresponding to the number of social media content items with positive sentiment, and a (bottom) negative portion 1022 corresponding to the number of social media content items with negative sentiment. The positive 1020 and negative 1020 portions are visually distinguished from each other, such that their relative percentages within the whole of the event bar is visible.

Figure 11A:
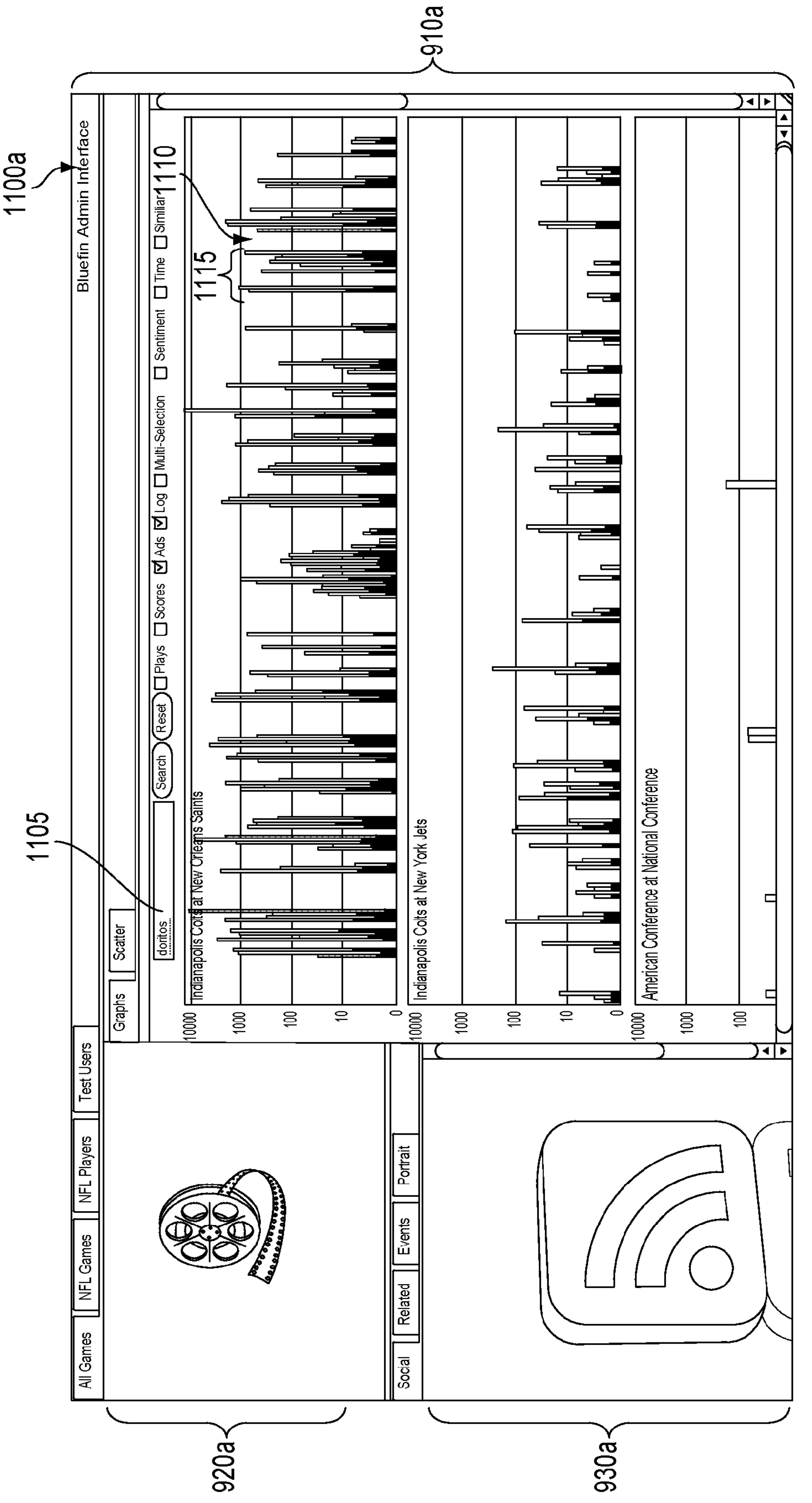
FIGS. 11A-11C show three embodiments of user interfaces of a social interest estimation system showing a filtered view.
Figure 11B:
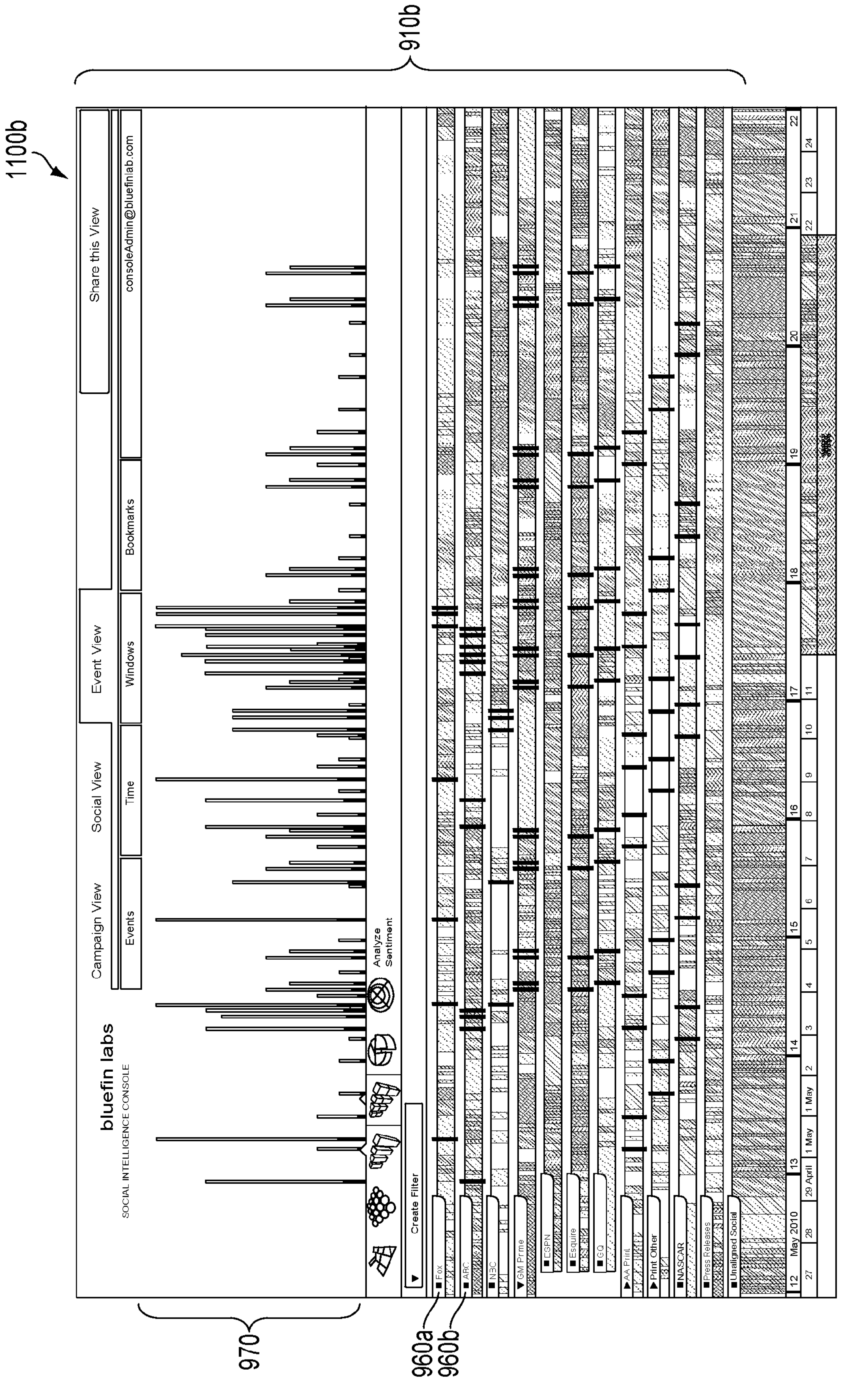
Figure 11C:
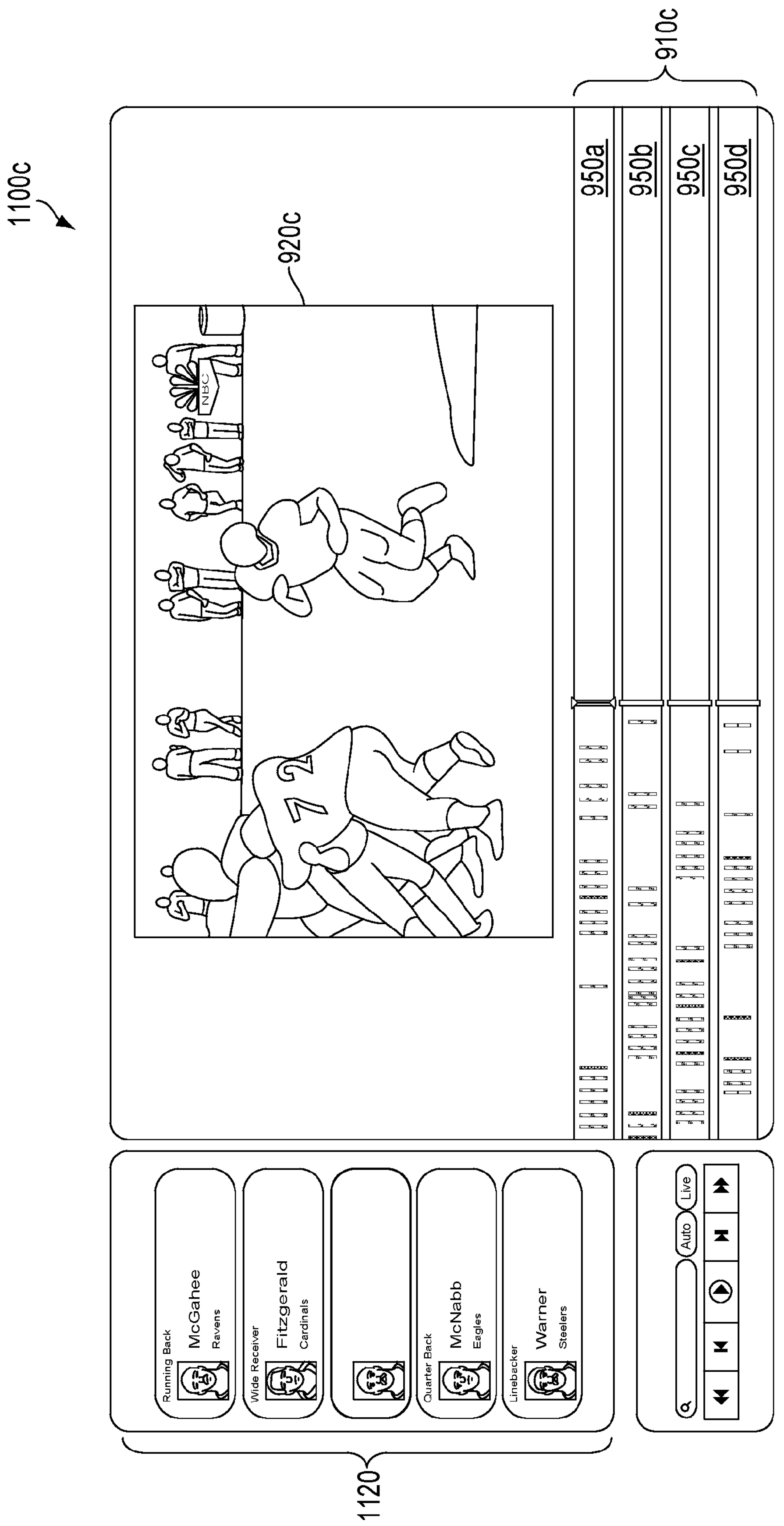

FIGS. 11A-11C show three embodiments of user interfaces 1100 of a social interest estimation system showing a filtered view. The user interfaces 1100 are similar to those shown in FIGS. 9A-9C, except that the social interest heat maps 940, 970 provide information for only a filtered subset of the social media content items.

FIG. 11A shows a text-based filter "doritos" applied to the data such that social media content item bars corresponding to Doritos brand advertisements (1110) show up darker, or otherwise visually distinguished, from the non-Doritos brand social media content item bars (1115).

FIG. 11B shows a text-based filter applied to the data (not shown) such that only social media content item bars corresponding to the applied filter are visible in the overall social interest heat map 970.

FIG. 11C shows a filter applied to the data corresponding to players in the user's fantasy football league, such that only social media content item bars corresponding to plays by the fantasy football players are shown in the social interest heat maps 950. An additional players area 1120 shows the players in the user's fantasy football league.

Figure 12A:
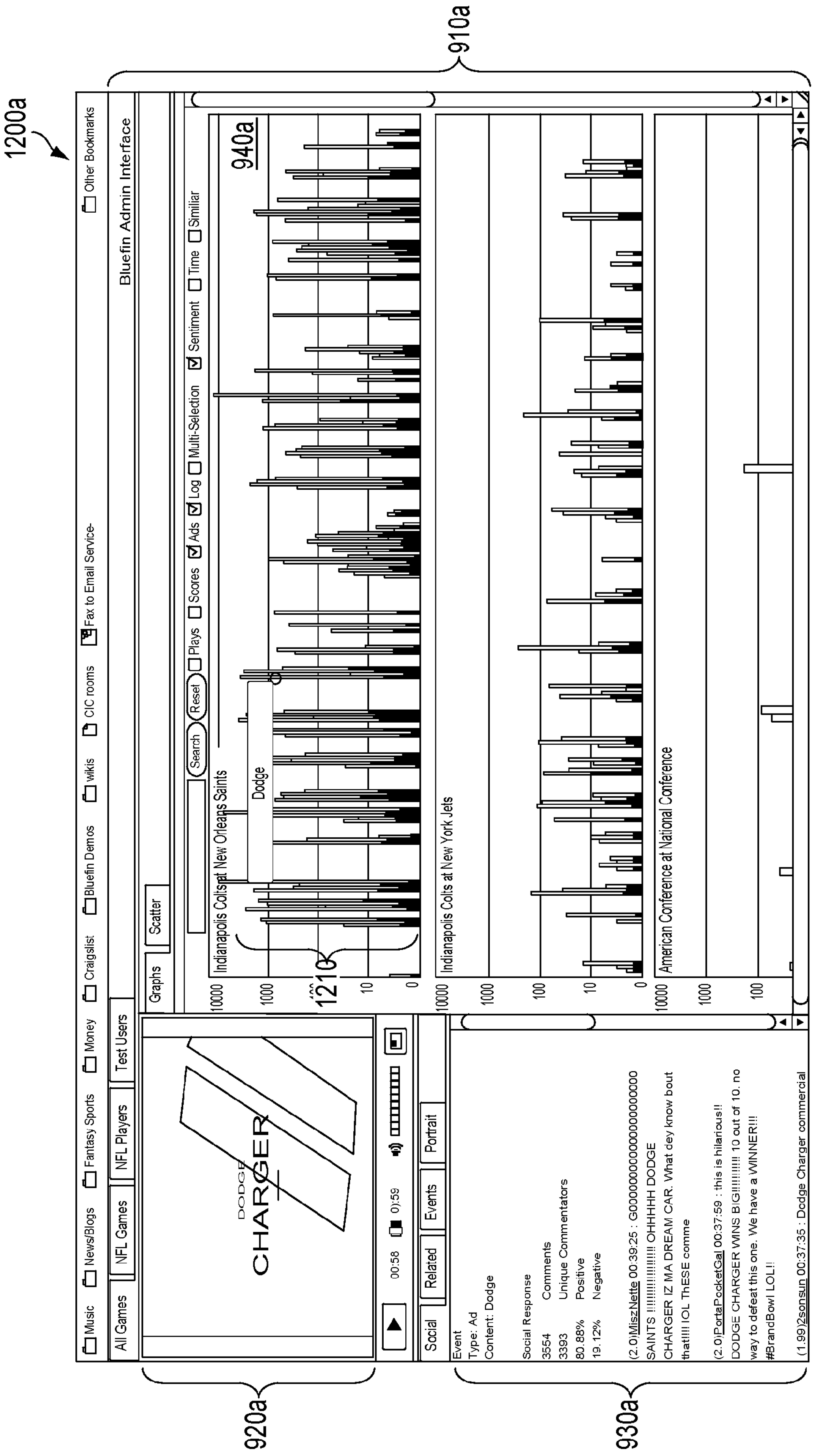
FIG. 12A shows one embodiment of user interface of a social interest estimation system showing a focused unexpanded view.
Figure 12B:
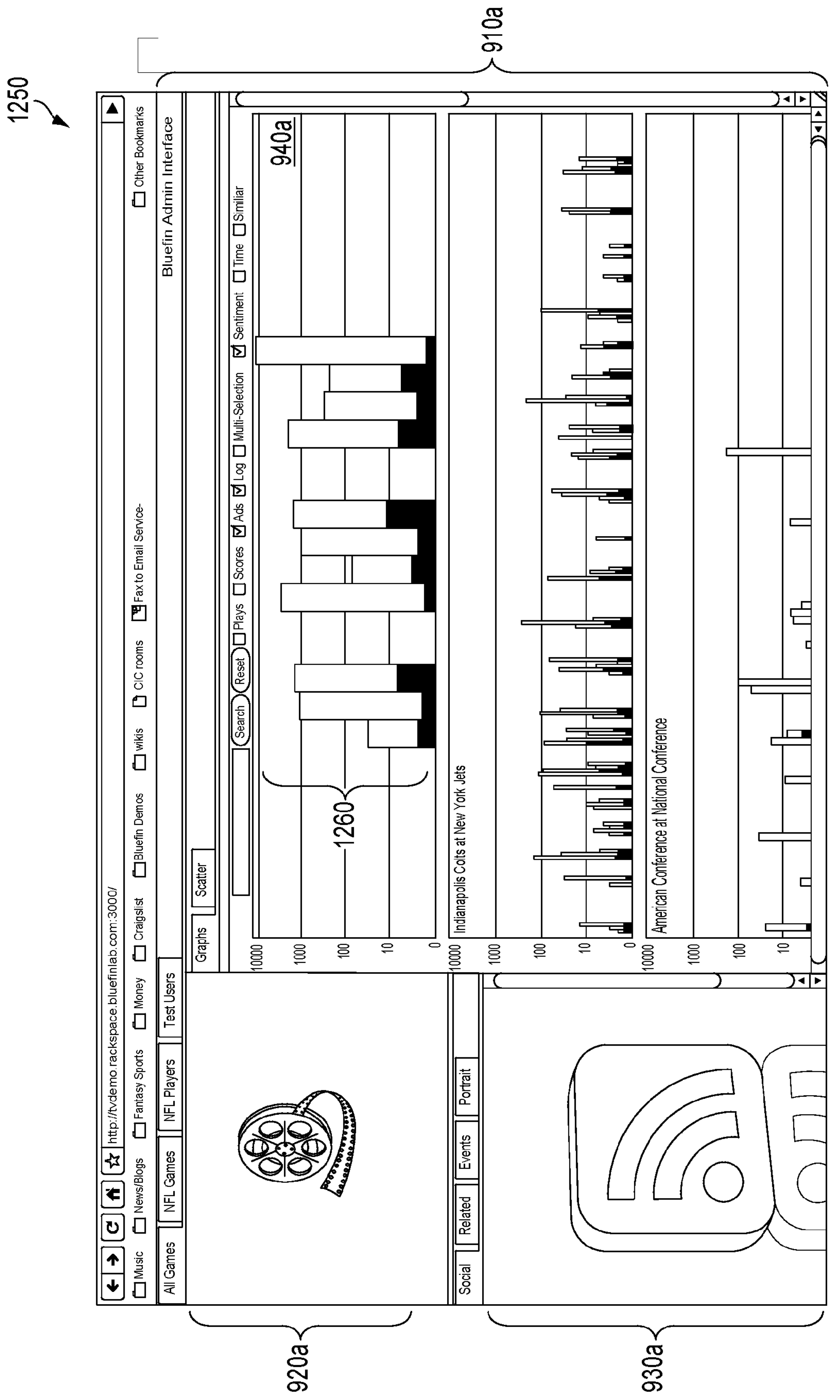
FIG. 12B shows one embodiment of user interface of a social interest estimation system showing a focused expanded view.

FIG. 12A shows one embodiment of user interface 1200 of a social interest estimation system showing a focused unexpanded view. The user interface 1200 is similar to that of FIG. 10A, except that the social interest heat map 940*a* has a subsection 1210 of the social interest heat map selected. FIG. 12B shows a user interface 1250 similar to that of FIG. 12A, except that it shows a zoom view 1260 of the social interest heat map 940*a* with the subsection 1210 from FIG. 12A expanded.

Audience Response Metrics Generation

Using mappings of time-based media events with social media content items, e.g., as stored in mapping store 275, various metrics can be calculated and ratings created for the time-based media. Ratings based on the time-based media events then can be created and published based on individual metrics or combinations thereof.

Figure 14:
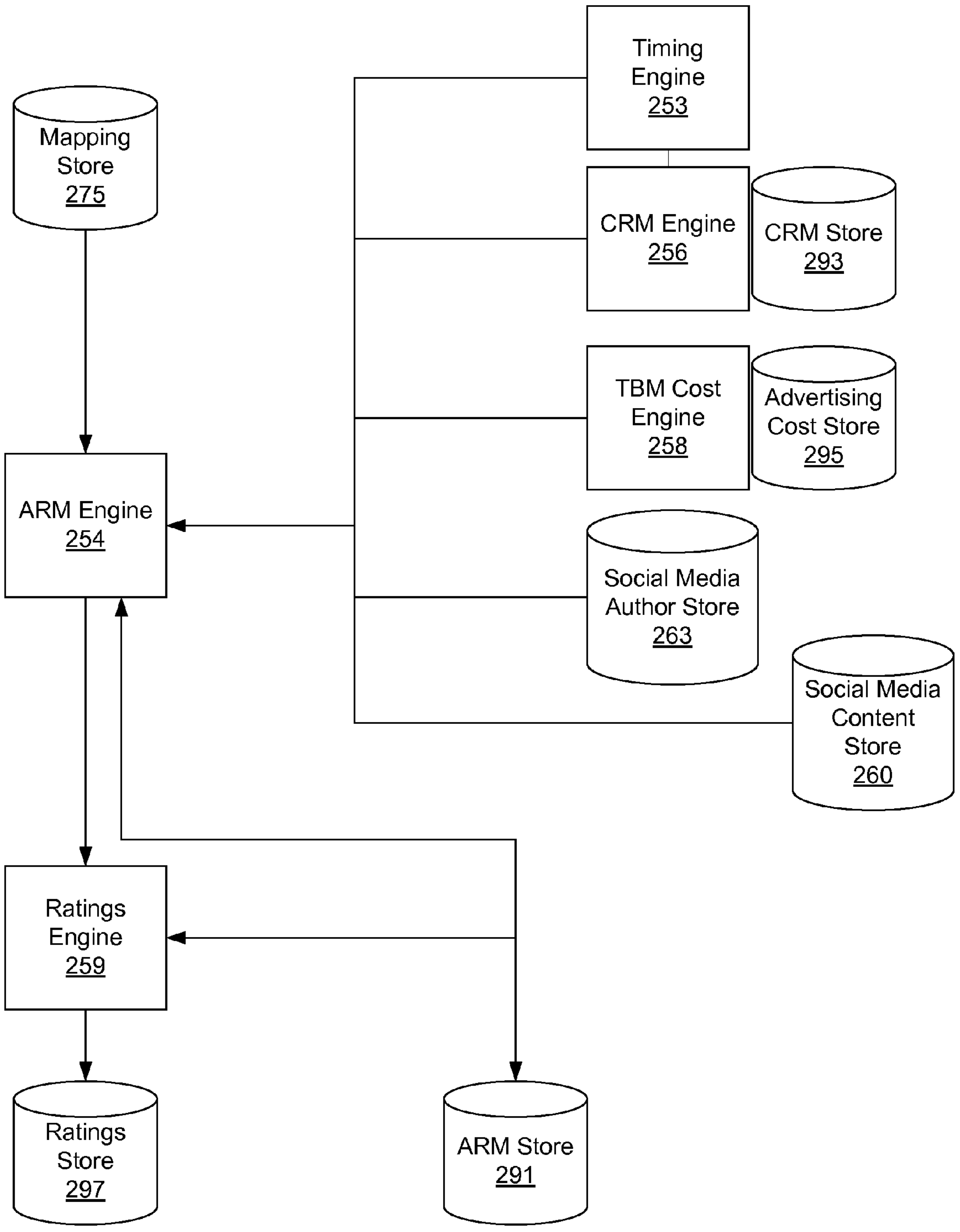
FIG. 14 is a flow diagram illustrating one embodiment of a method for rating time-based broadcast media based on audience response via social media.

FIG. 14 is a flow diagram illustrating one embodiment of a method for rating time-based media based on audience response via social media. The input to the process is the mappings that are the output of the social media/event alignment 330 process, which mappings are stored in the mapping store 275. The stored mappings are between time-based media events, which correspond to chronological time segments of the time-based media, and social media content items that have been determined to be associated with the time-based media event.

For a given time-based media event, one or more audience response metrics are generated by the audience response metrics engine 254, which is calculated using the social media content items associated with the event. Additional inputs to the process are used depending on the types of metrics being generated, e.g., including input from the timing engine 253, the consumption-based metrics engine 256 and store 293, the time-based media cost engine 258 and store 295, the social media author store 263, and the social media content store 260. Other inputs may be used according to other embodiments. A list of some of the metrics generated by the audience response metrics engine 254 according to one embodiment is described below.

Audience Response Metrics

Audience Response Metrics (ARMs) are aggregated statistics that measure various aspects of how populations of users are responding to time-based media events. ARMs include all of the measures below, and can be divided into a number of classes. A first class of ARMs is content item-based ARMs, or ciARMs, which are metrics that measure audience response by the number of individual content items associated with an event, either for the individual event or in relation to other events.

A second class of ARMs is unique author-based ARMs, or UARMs, which are metrics that measure audience response by the number of unique authors of content items associated with an event, either for the individual event or in relation to other events.

A third class of ARMs is network-based ARMs, or NARMs, which are metrics of audience response that take into account the network of connections between authors of content items associated with an event.

Each of these classes also can be broken down into ARMs that are reflective of values specific to individual events, and values that compare events. In addition, various filters can be applied to the various ARMs, and ARMs can be combined with other ARMS, consumption based metrics (CBMs), and/or monetary values associated with time-based media events.

ciARMs

Content item-based ARMs that are specific to a particular event, and include Audience Response Count, Audience Response Rate, and some forms of Audience Response Acceleration.

Audience Response Count (ARC) is the total number of social media content items aligned with a given time-based media event. This can be a raw count value, a log scale, or a value normalized against a selected set of events. For example, for a given NFL football game, there may be 18,000 social media content items aligned with that event.

Audience Response Rate (ARR) is the ARC for the time-based media event normalized by time. ARR captures the rate at which audience members are responding to the event through social media. An example calculation is the ratio of ARC to length of the event, e.g., [ARC/length]. Length can be in terms of minutes, e.g., to normalize ARCs for comparing events of different lengths (e.g., 30 minutes versus 60 minutes). Calculation of ARR may include additional input from the timing engine 253. Continuing the above example, if the football game lasted three hours (180 minutes) then the ARR over the entire length of the game would be 18,000/180, or 100 items per minute.

Audience Response Acceleration (ARA) is a measure of the rate of change between ARRs at different times within an event. ARA thus captures how audience interest changes during a given event, as indicated by changes in the rate at which audience members are posting social media items about the event. ARAs measure the rate of change between two times within a single event. For example, the first 10 minutes of an event could be compared to any other 10 minute segment of a 60 minute event, which would provide information about which portions of the event prompted the greater audience response. An example calculation is the ratio of change in ARR to change in time, e.g., $[(ARR_{t2}-ARR_{t1})/(t2-t1)]$, where $ARR_{ti}$ is the ARR value at times t1 and t2. Time can be measured in various ways, including minutes, seconds, segments (not including commercials), scenes, etc. Continuing the football game example, the above-noted ARR of 100 items per minute represents the average number of items per minute over the entire game. However, that ARR does not provide information about individual times within the event, during which times the ARC might be higher or lower than the average 100 items. For example, if during the first 10 minutes of the game the ARR is 100 and during the 10 minutes one hour into the game the ARR is 200, ARA is calculated as (200−100)/50 min, or an acceleration of 2. Calculation of ARAs may include additional input from the timing engine 253.

Content item-based ARMs that compare events include Audience Response Share and some forms of Audience Response Acceleration, as well as direct comparisons between ARCs, ARRs, and ARAs for different events.

Audience Response Share (ARS) is a measure of audience response to a time-based media event during a time period normalized by total audience response for all time-based media events during the same time period. ARS measures how much of the total audience for all time-based media during a given period are responding to a particular event during that period. The underlying ARMs used can be ARC, ARR, etc. Time periods can be any measurable period of interest, including programming time slots (8:00-8:30 p.m.; 8:00-9:00 p.m.), portions of a time slot or event (e.g., 8:00-8:10 p.m.), viewing segments (midday; primetime), entire day, week, season, etc. An example calculation is the ratio of the ARM for a given event i at given time t to the total of the ARMs for all other events k at that time, $[ARM_{i,t}/(\Sigma ARM_{k,t})]$. For example, if the ARC for a new television show at 8:00-9:00 pm is 10,000 and the total of all ARCs for that time period is 500,000, the ARS would be equal to 0.02, or 2% of the total ARC (2% of total response across all shows) for that time period. By contrast, if a very popular television show had an ARC of 100,000 for the same period, the ARS would be 0.2, or 20% of the total ARC (20% of response across all shows) for that time period.

As noted above, ARA is a measure of the rate of change between ARCs. Audience Response Trend (ART) is akin to an inter-event ARA, as it measures the rate of change between two different instances of a time-based media event (or different instances of a type of time-based media event) over the duration between the instances. Duration can be absolute time between events (minutes, hours) or relative (number of airings between events). For example, the ARC for the first episode of the season of a TV show could be compared to the ARC for the fifth episode, e.g. normalized by the number of weeks between shows or number of episodes in between. An example calculation is the ratio of change in ARC to duration for the change, e.g., $(ARC_{t2}-ARC_{t1})/(t2-t1)$, where t2 and t1 are the times at which the ARCs are measured. Using the example above, if a first episode of the season of a television show had an ARC of 10,000, and a fifth episode of the season had an ARC of 15,000, and there were four weeks between the episodes, the ART would have a positive trend of 1,250 ARCs per week. Calculation of ARTs may include additional input from the timing engine 253.

In addition ARC, ARR, ARA, and ART for individual events, as discussed above, can be aggregated (e.g., summed, unweighted, or weighted) and/or directly compared to each other during a specified time period, e.g., a scheduled programming time slot, viewing segment, day, week, season, etc. For example, ARCs for all primetime shows during a given week could be aggregated into a ranked list, e.g., for ratings determinations.

UARMs

The above-discussed ARMs alternatively can be measured by unique authors of social media content items instead of total content items. These are the second class of metrics called Unique Author Response Metrics (UARMS), which are metrics that measure audience response by the number of unique authors of content items associated with an event. UARMS that are specific to an event include Unique Author Response Count, Unique Author Response Rate, and Unique Author Response Acceleration. As with the content item based ARMs, each can be broken down into UARMs that are reflective of values specific to individual events, and values that compare events. For UARMs, the calculation may include additional input from the social media author store 263.

Unique Author Response Count (UARC) is the total number of unique authors of social media content items aligned with a time-based media event. The UARC can be a raw count or use a log scale. For example, for a given NFL football game there may be 18,000 content items authored by 6,000 unique authors, with each author averaging 3 items.

Unique Author Response Rate (UARR) is the UARC normalized by time. An example calculation is the ratio of UARM to length of the event, e.g., [UARC/length]. Length can be in terms of minutes, e.g., to normalize UARCs for comparing events of different lengths (e.g., 30 minutes versus 60 minutes). Calculation of UARR may include additional input from the timing engine 253. Continuing the above example, for a three hour football game, there would be 2000 unique authors per hour.

Unique Author Response Acceleration (UARA) is a measure of the rate of change between UARRs for two times within an event over the duration between the times. UARA captures how stable or growing is the audience interest in an event. For example, the first 10 minutes of an event could be compared to any other 10 minute segment of a 60 minute event, which would provide information about which portions of the event prompted the greater number of unique authors contributing content items. An example calculation is the ratio of change in UARR to change in time, e.g., $[(UARR_{t2}-UARR_{t1})/(t2-t1)]$. Continuing the above example, if during the first quarter of a football game there were 1,000 unique authors who responded, and then in the third quarter there were 4,000 additional unique authors who responded, that would indicate that there was very significant acceleration in audience for this event. By contrast, if the number of unique authors during both quarters remained 1,000, that indicates a stable audience. As with ARAs, time can be measured in various ways, including minutes, seconds, segments (not including commercials), scenes, etc. Calculation of UARAs may include additional input from the timing engine 253.

UARMs that compare events include Unique Author Response Share and some forms of Unique Author Response Trend, as well as direct comparisons between UARCs, UARRs, and UARAs for different events.

Unique Author Response Share (UARS) is a measure of unique author response to a time-based media event during a time period normalized by the number of total unique authors responding to all time-based media events during the same time period. UARS captures what proportion of the unique authors during a given time period were interested in a specific media event, relative to other media events at that time. UARMs used can be UARC, UARR, etc. Time periods can be any measurable period of interest, including programming time, portions of a time slot or event, viewing segments, day, week, season, etc. An example calculation is the ratio of UARM at a given time to all UARMs at that time, e.g., [UARM(time t)/(ΣUARMs(time t))]. For example, the UARM for a show at 9 pm is 1,000, and the sum of all UARMs for all shows in that time slot is 150,000, then the UARS is less than a 1% share of all unique authors during that time slot, i.e., the show is not watched by a very broad audience. In addition, the time limitations could be removed from the denominator (e.g., sum of all known UARMs across all times) to determine the UARS as a function of all known unique authors of all items to yield an Aggregated Unique Author Response Share (AUARS), indicating a percent response among the population of all unique authors. For example, if a show gets a response (UARM) of 500,000, and the total number of known unique authors is 5,000,000, the AUARS is 10% of all known unique authors.

The unique author Audience Response Trend (UART) is a measure of the rate of change between UARCs for instances of an event (or instances of a type of time-based media event) over a duration between the instances. Duration can be absolute time (minutes, hours) or relative (number of airings in between). For example, the UARC for the first episode of the season of a TV show could be compared to the UARC for the last episode, e.g. normalized by the number of weeks between the first and last episodes or number of episodes between them. For example, a UARC for a first episode of 5,000 unique authors and a UARC for a second episode of 7,000 unique authors would produce a positive trend of 2,000 unique authors between episodes one and two. An example calculation is the ratio of change in UARC to duration between UARCs, e.g., [($UARC_2-UARC_1$)/D($UARC_2-UARC_1$), where D represents duration]. Calculation of UARTs may include additional input from the timing engine 253.

In addition, UARC, UARR, UART, and UARA for individual events, as discussed above, can be aggregated and/or directly compared to each other during a specified time period, e.g., a scheduled programming time slot, viewing segment, day, week, season, etc. For example, UARCs for all primetime shows during a given week could be aggregated into a ranked list to show the UARCs relative to other primetime content.

NARMs

The above-discussed ARMs alternatively can be measured taking into account the network of connections between authors of content items associated with an event. These are the third class of metrics called Network-based Author Response Metrics (NARMs), which are metrics that measure audience response by the number of users who are connected to authors of content items associated with time-based media events. By incorporating the network structure of content item authors, NARMs provide measures that capture the resonance of audience response to an event amongst other users within the social networks of the authors of those content items. Resonance, as used herein, means the effect that a first responding author (in a network of responding authors) has on other responding authors in his/her network(s). In such a measurement, the first author's response itself may affect the overall audience response, e.g., responding viewers of the same event who did not respond prior to the first author's response, or viewers who increased their number of responses based on the first author's response, or connections of the first author who became viewers (i.e., turned on the show, watched it using a video on demand service, or otherwise time-shifted the program) based in part on the first author's response—each of these groups of authors may increase the overall counts based in part on the first author's response. (As used here, "first" does not necessarily mean the author is first in time to respond, but rather first relative to subsequent responders in the same network.) By measuring such resonance, NARMs afford insight into not only the quantity of response to an event, but also the amount of exposure (including an indication of virality) that that response garners.

In one implementation, the NARM for an event may be computed as the cardinality of the set which is composed of the union of all sets of users in the networks of the authors of content items associated with that target event:

$$NARM(\text{event}) = \left| \bigcup_{c \in content-items(event)} \{\text{users\_in\_network(author\_of}(c))\} \right|$$

This measurement allows for overlap, as several user authors may share connections with each other.

In another implementation, the NARM for an event may be computed as the cardinality of the set which is composed of the intersection of all sets of users in the networks of authors of content items associated with the target event:

$$NARM(\text{event}) = \left| \bigcap_{c \in content-items(event)} \{\text{users\_in\_network(author\_of}(c))\} \right|$$

This measurement eliminates overlap and redundancy based on a user falling into the network of more than one author by measuring unique users.

NARMS that are specific to an event include Network-based Author Response Count, Network-based Author Response Rate, Network-based Audience Response Trend, and Network-based Author Response Acceleration. As with the content item based and unique author ARMs, each can be broken down into NARMs that are reflective of values specific to individual events, and values that compare events. For NARMs, the calculation may include additional input from the social media author store 263.

Network-based Author Response Count (NARC) is the cardinality of the set of combined users in the networks of the authors of content items associated with a target event. This can be a raw count or use a log scale. For example, given two events with the same number of unique authors, the NARC for one event still may be higher than the other if the authors responding to one event, on average, have larger social networks than the other event. For an event with 5,000 unique authors, the NARC may be 1,000,000 if the 5,000 authors have, on average, 200 connections in their respective networks. In this example, the NARC is a union type, and thus does not consider whether there is overlap between the authors in the networks. For a NARC that is an intersection type, for the same 5,000 unique authors, the NARC may be lower, e.g., 750,000 considering that the 200 (average) connections of the unique authors overlap with each other, Network-based Author Response Rate (NARR) is the NARC normalized by time. An example calculation is the ratio of NARM to length of the event, e.g., [NARC/length]. Length can be in terms of minutes, e.g., to normalize NARCs for comparing events of different lengths (e.g., 30 minutes versus 60 minutes). Using the above event and the union type of cardinality, the NARC about (1,000,000) is divided by 60 minutes to produce a NARR of 16,667. Calculation of NARR may include additional input from the timing engine 253.

Network-based Author Response Acceleration (NARA) is a measure of the rate of change between NARRs for two times within an event over the duration between the times. For example, the first 10 minutes of an event could be compared to any other 10 minute segment of a 60 minute event, which would provide information about which portions of the event prompted the greater number of unique authors contributing content items. An example calculation is the ratio of change in NARR to change in time, e.g., $[(NARR_2-NARR_1)/(t_2-t_1)]$. As with other ARAs, time can be measured in various ways, including minutes, seconds, segments (not including commercials), scenes, etc. For example, the NARAs for two equal-length shows for a first 10 minutes and last 10 minutes of the shows may be identical, e.g., (200−100)/50 min, or two-fold acceleration of unique author response rate between the first 10 minutes and the last 10 minutes. However, if the authors for the first show on average have larger networks (e.g., 250) than the authors for the second show (e.g., 150), the NARA for the first show (e.g., (100×250)/50, or 500) will be higher than for the second show (e.g., 100×150)/50, or 300). Calculation of NARAs may include additional input from the timing engine 253.

NARMs that compare events include Network-based Author Response Share and Network-based Author Response Trend, as well as direct comparisons between NARCs, NARRs, and NARAs for different events.

Network-based Author Response Share (NARS) is a measure of network-based response to a time-based media event during a time period normalized by the total amount of network-based response for all time-based media events during the same time period. NARMs used can be NARC, NARR, etc. Time periods can be any measurable period of interest, including programming time, portions of a time slot or event, viewing segments, day, week, season, etc. An example calculation is the ratio of an NARM at a give time to all NARMs at that time, e.g., $[NARM_t/(\Sigma NARMs_t)]$. For example, again using the union type NARC from the first example above of 1,000,000 exposed users, over the total NARMs for all events during the same timeframe, e.g., 500,000,000, would produce a NARS of 0.2 percent of all exposed users. In addition, the time limitations could be removed from the denominator (e.g., sum of all NARMs at time t) to determine the NARS as a function of the total number of users within a network to yield an Aggregated Network-based Author Response Share (ANARS), indicating a percent network-based response among the population of the entire network.

NART is a measure of the rate of change between NARCs for two instances of an event (or instances of a type of time-based media event) over the duration between the instances. Duration can be absolute time (minutes, hours) or relative (number of airings in between). For example, the NARC for the first episode of the season of a TV show could be compared to the NARC for the last episode, e.g. normalized by the number of weeks between the first and last episodes or number of episodes between them. For comparison between events of the same type, NARCs could be measured between the first and last commercial during a time slot, which might not be instances of the same event, but rather of events of the same type (e.g., commercials). As above, the NARCs could be compared relative to the time between the commercials, or the number of other commercials in between. An example calculation is the ratio of change in NARC to duration between NARCs, e.g., $(NARC_2-NARC_1)/D(NARC_2-NARC_1)$, where D represents duration. Calculation of NARAs may include additional input from the timing engine 253.

In addition, NARC, NARR, NART, and NARA for individual events, as discussed above, can be aggregated and/or directly compared to each other during a specified time period, e.g., a scheduled programming time slot, viewing segment, day, week, season, etc. For example, NARCs for all primetime shows during a given week could be aggregated into a ranked list.

Filters

The audience response metrics engine 254 also can apply various filters to any of the above ARMs to produce more specific measures. Filter types include event type, observation manner, audience demographics, author influence, response content, and response timing.

A first filter is an event type filter. Event types can be considered at various levels of granularity. For example, an event type might include all sporting events, or just football events, or just NFL events, or events for a specific team. Similarly, an event type might include all advertisements, or advertisements for a particular product, industry sector, company, brand, etc. Event type filters all regular ARMs such that they reflect numbers only for events within the filter parameters. In addition, an event type filter may be applied while simultaneously removing time restraints for the ARM. For example, allowing comparison of audience response to a time-based event against others at a similar level of granularity, across different time frames. For example, imagine an UARS for a show airing during the 8 pm hour with 5,000 unique authors of 10% based on 50,000 unique authors at 8 pm across all shows. A filtered UARS can then be computed by limiting the events used to compute the UARS to all situation comedies, and additionally can be expanded to include a time frame across the entire day. Application of an event type filter may require additional information about the event type as stored in the mapping store 275. The event type information was used during the mapping process (e.g., of FIG. 3), from information received from the event metadata store 273.

Another filter that can be used to modulate the audience response metric is based on the manner of observation by which an event was viewed. Audience response to a time-based media event can be partitioned based upon the way in which the members of the audience observed that event. For example, some portion of an audience responds to an event that they observe live (e.g., the first run of a television show). However, other portions of the audience can be said to respond to the same event, even though they observed it at different times (e.g., as a rerun of the first run broadcast). Additionally, "on demand" viewing technologies allow audiences to observe time-based media events in a growing number of ways; for example, on DVD, using time-shifting technologies like Tivo or digital video recorders, on the Internet through websites like Hulu.com or Netflix.com, on IPTV using devices such as Apple TV or Google TV, or through set-top box on demand services. Audience Response Metrics can be filtered based on the manner of observation to create more specific ARMs; for example, a time-shifted Audience Response Count measures the number of content items associated with an event that was viewed using time-shifting technologies. Application of manner of observation filters may require additional information about the content item as stored in the social media content store 260, and the timing of the item, as stored in the timing engine 253.

Another way the audience response metrics engine 254 can filter the data is by the responding audience demographics. Demographic filters allow for measuring ARMs for a subset of audience members, e.g., by age, gender, income level, location, education level, ethnicity, etc. For example, applying a female author filter to UARC would produce the count of all female unique authors who responded to a given time-based media event. In some cases, multiple demographic filters may be applied (e.g., men, age 18-25). Application of a demographic filter may require additional information about the authors as stored in the social media author store 263.

Another filter is author influence. An Author Influence Score (AIS) is a value assigned to an author based on his/her influence within mass media and/or social networks. The basis of the AIS may be the number of others the author is connected to in his/her social network(s), or any other measure of how influential an author may be within his/her network(s). A threshold AIS can be set as a filter for authors to include in the ARMs to determine the response to a time-based media event by more influential authors. Application of an author influence filter may require additional information about the authors as stored in the social media author store 263.

ARMs also can be filtered by the content of the responses according to various categories. For example, categories include sentiment of the response (e.g., positive, negative, neutral), subjectivity of the response (e.g., primarily fact-based vs. opinion-based), independence of the response with respect to other content (e.g., with/without links or other content), etc. Response content filters allow the ARMs to be separated out by these categories to further assess response. For example, the overall count of content items for a time-based media event might be high, which might appear to represent positive feedback for the event, but the numbers may represent mostly negative responses, resulting in a very different conclusion about the overall response. Application of a content filter may require additional information about the content of the social media content items, as stored in the social media content store 260. The process for using the additional information to apply a content filter may be similar to the content weighting function 710 for the social interest estimation process, as described in conjunction with FIG. 7.

Yet another available filter is response timing, examples of which include filters for capturing response in anticipation of a time-based media event or lingering response for an event in the past. For example, in broadcast television much of the programming is scheduled ahead of air time, and thus information about the programming is available to the public ahead of many time-based media events. Thus, ARMs can be filtered based on responses determined to occur before (i.e., in anticipation of) an upcoming event. Application of a response timing filter may include additional input from the timing engine 253.

Combined Metrics

The above-discussed ARMs can be combined by the audience response metrics engine 254, with or without filtering, in many different useful ways for understanding audience engagement with time-based media events. Multiple ARMs can be combined, ARMs can be combined with Consumption Based Metrics (CBMs), and/or ARMs can be combined with other information about the time-based media, such as costs associated with various time-based media events, as well as information about the authors of content items associated with events.

For example, demographic and response content filters first can be applied, combined with Unique Author Response Share (UARS) to provide a measure of positive response to an event normalized by the total count of positive female response to events within the same time period. Then the event could be compared to all other events within the time period (UARS), further filtered by event type. This could provide information about positive female response to an event, e.g., an advertisement for a particular clothing retailer, as compared to other ads for clothing retailers in a one-week period.

In another example, only pre-event content items are considered for a time-based media event, such as events that occur before a season premiere of a television series. ARA could then be calculated between time 0, e.g., before any advertisement of the new season; time 1, e.g., after a first series of advertisements that the next season is coming; and time 2, e.g., after a preview is shown, to determine how each impacted the audience anticipation of the event. These metrics then could be compared to similar numbers for previous seasons to determine whether anticipation has gone up or down since the previous year, or compared to metrics for other television series with similar advertising schedules, as a measure of anticipated engagement with the series versus other series premieres.

In yet another example, the number and distribution of audience responses over various times and among an author's networks during the time-based media event could be used to determine the virality of audience response to the event (e.g., highly viral response would be indicated by overall numbers that increase quickly and are high in number of unique authors responding, especially among authors connected in a network), the breadth of the audience responding to the event (e.g., if many content items are provided, but only by a small number of unique responders, which would indicate strong appeal to a narrower audience), or other measures of event popularity and engagement levels among the responding audience.

Measures of various ARMs can be combined by the audience response metrics engine 254 with Consumption Based Metrics (CBMs), which are measures of audience consumption, to estimate the number of viewers who respond to an event and estimate response percentages. For example, an ARM for an event can be divided by an estimated audience size that viewed the event (based on a CRM) to provide a metric of Audience Response per, e.g., 100,000 viewers. Further, ARMs can be normalized by the percentage of total viewing audience that an event receives to provide a metric of Audience Response per percentage point of total audience size (for a specific time period). Also, ARMs can be divided by the potential size of a viewing audience (as estimated, for example, by the total number of homes with televisions in the US) to provide a metric of Audience Response as a share of all possible viewers of an event. Calculation of metrics combining ARMs and CBMs may include additional input from the consumption-based metrics engine 256 and/or consumption-based metrics store 293.

ARMs and CBMs can be used by the audience response metrics engine 254, in conjunction with monetary values associated with an event, to estimate value via a monetary value metric. For example, a monetary value (cost) may be associated with advertisements placed during a particular broadcast television show. Thus, an ARM for that show can be divided by the cost of advertising during that show, in order to generate a normalized measure of the engagement per dollar value for the show. Similarly, the ARM for the advertisement itself can be measured against the cost; thus, generating another measure of engagement per dollar value for that advertisement. In addition to costs associated with advertising within a show, ARMs can be normalized by the costs associated with an event itself. For example, the ARM for a television show can be normalized by the cost of producing the show. Monetary value metrics may include additional input from the time-based media cost engine 258 and/or advertising cost store 295.

The above discussed ARMs can be combined with information about content items associated with time-based media events to create weighted ARMs. In one example, ARMs can be weighted by measures of the influence of each author of a content item. Such a weighted ARM provides a measure in which higher values are associated with response that comes from more influential authors. Application of an author influence weighting may require additional information about the authors as stored in the social media author store 263, and may proceed according to the weighting function 710 described in conjunction with FIG. 7.

Turning again to FIG. 14, the various audience response metrics generated by the audience response metrics engine 254, as described above, are stored in the audience response store 291. The stored metrics later may be used by the ARM engine 254 for calculations of additional metrics, or used by the ratings engine 259 for ratings determinations. The metrics and/or the ratings themselves may be used in various ways, e.g., future content considerations, planning, advertising scheduling, etc.

Thus, the above metrics can be used in a variety of different ways to determine desired statistics. Through a process including selection of one or more ARMs and optional applications of one or more filters, e.g., by ARM engine 254, optional normalization by various means such as time, a larger subset of time-based media, etc. (e.g., using timing information from timing engine 253), and/or additional consideration of one or more secondary measures such as combining with other ARMs or CBMs (e.g., using CRM store 293). For example, a basic method might include the steps of storing mappings between each time-based media event and social media content items associated with the time-based media event, selecting one of the time-based media events, calculating an audience response metric for the selected event (including application of filters, application of various additional data from other data stores, combination with another ARM or a CBM, determination of costs, etc.), and, if desired, providing a rating for the time-based media event.

For example, consider measuring response to a commercial for a slow-release iron product. Starting with a count of all unique authors responding to an event (UARC), say 10,000 unique authors, as determined by the ARM engine 254 from the mapping store 275, a filter is applied by the ARM engine for authors over 50 years of age (e.g., using data from the social media author store 263), bringing the unique author count to 2,500. That value may then be normalized by the ARM engine 254 by the response by all over-50 unique authors to all commercials at 6 pm (e.g., 10,000), for example using data from the timing engine 253, to produce a UARS of 25% for this group. The UARS then could be compared by the ARM engine 254 to a CBM from the CBM store 293 indicating the number of viewers at 6 pm who are over age 50 viewing the channel the commercial was on (e.g., 100,000) and overall (e.g., 1,000,000), to produce results indicating that of all viewers over age 50 who likely saw the commercial, 2.5% responded to the commercial. This percentage could be compared by the ARM engine 254 to 1% of that population responding to all commercials in the same time slot, indicating a stronger than average response to the commercial. In addition, ratings could be determined for the commercial by the ratings engine 259.

Ratings, as described elsewhere herein, which can be based on any of the metrics described herein or combinations thereof, can be created and published by the ratings engine 259. Generally, a rating is specific to a particular time-based media, so that given a set of time-based media events, and their respective ratings, the events can be ranked accordingly. From the ranked events, additional information can be derived, such as monetary evaluations of the events. In addition, the metrics and/or rankings can be used for determinations of content creation, media planning, and/or media buying.

Ratings can take various forms. For example, ARCs for all primetime shows during a given week could be aggregated as a total response rating, indicating the broadcast media events during a defined time period with the highest number of responsive individual content items via social media. For example, ARCs could be calculated individually for every show in primetime. The respective ARCs then could be ordered largest to smallest to show this ranking, with the highest ARCs having the highest ranking Another example is all UARCs for the same primetime shows, calculated individually for each show, which then are aggregated and ordered to show total engagement rating for all primetime shows based on number of unique authors responding.

Again using the same primetime shows, the ratio of the UARC (i.e., unique viewers responding) to a CBM for the show, e.g., the estimated number of viewers of the show, which produces an estimated percentage of viewers responding, could be aggregated for all of the shows and ordered to provide ratings indicating the broadcast media events during the time period with the greatest percentage of viewers responding via social media. Using a single time period (e.g., primetime), these examples show how application and aggregation of various metrics can produce various ratings, e.g., ratings based on total response, total responsive authors, and percentage of viewers responding. Many other variations of ratings can be determined using the calculated metrics.

Once ratings are determined by the ratings engine 259, they are stored in the ratings store 297. Ratings from different times may be compared based on the stored information. The ratings may be published in some embodiments, e.g., by the social interest information provider 130 or a third party.

In addition, the social interest information provider 130 can expose an API 202 as described in conjunction with FIG. 2 to provide the ratings information to advertisers, broadcasters, and other third parties as a service. For example, through the API the third party could input keyword(s) and get back ratings information associated with the keyword. Keywords could include the name of a show, a product, a particular episode, etc. The API could allow the third party to specify the type(s) of rating information desired, view pricing structures for the ratings data, set time when to provide the ratings data, how often to provide an update to the ratings data, etc.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising computer program code stored on a non-transitory, tangible computer readable storage medium, which is configured to be executed by a computer system for performing any or all of the steps, operations, or processes described. A computer system is understood to include one or more computers, each computer including one or more hardware-based processors, primary memory devices (e.g., RAM, ROM), secondary storage devices (e.g., hard discs or solid state memory), and networking devices (e.g., networking interface cards). The computers in a computer system can be interconnected by wired medium (e.g. Ethernet, fiber optic), or wireless medium (e.g., radio-based networks, such as 802.11, 802.16), or combination thereof.

Embodiments of the invention may also relate to an apparatus for performing the operations herein. This apparatus may be specially constructed for the required purposes, and/or it may comprise a general-purpose computing device selectively activated or reconfigured by a computer program stored in the computer.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:

identifying a plurality of social media content items authored by users of a social networking system and publicly broadcasted by the social networking system;

accessing, by a computer processor and in a computer repository, a plurality of mappings between a time based media event corresponding to a chronological segment of time based broadcast media and a subset of the social media content items designated as being relevant to the time based media event;

programmatically identifying a user subset comprising users of the social networking system who authored the subset of the social media content items mapped to the time based media event;

accessing, by the computer processor, a consumption metric regarding a size of an audience for the broadcast of the time based media event; and calculating, by the computer processor, a level of engagement on social media based on the size of the audience associated with the consumption metric and based on a number of users in the user subset.

2. The method of claim 1, wherein the level of engagement is based on a ratio of a number of users in the user subset and the size of the audience.

3. The method of claim 1, further comprising filtering the user subset based on a demographic filter, the demographic filter based on at least one selected from a group consisting of: age, gender, and geographic location.

4. The method of claim 2, wherein the consumption metric is based on demographic information for the audience, and wherein the method further comprises filtering the size of the audience of the consumption metric based on the demographic filter.

5. The method of claim 1, wherein the time based media event is an advertisement type media event, wherein the time based media event is associated with a monetary cost, and wherein the method of claim 1 further comprises:

dividing at least one selected from a group consisting of (i) a number of users in the user subset and (ii) a number of social media content items in the subset of social media content items, by the monetary cost to determine an engagement per dollar value for the time based media event.

6. The method of claim 1, wherein the subset of social media content items are authored within a time period of an airing of the time based media event.

7. The method of claim 1, wherein the consumption metric is at least one selected from a group consisting of an estimated viewing audience size for the time based media event and an estimated audience size capable of viewing the time based media event via television.

8. The method of claim 1, further comprising:

storing a duration for the time based media event; and wherein the level of engagement is based upon a ratio of (i) the number of users in the user subset to (ii) the duration of the time based media event.

9. The method of claim 1, further comprising:

accessing a second plurality of mappings between a plurality of time based media events corresponding to the chronological segment and a second subset of the social media content items determined to be relevant to at least one of the plurality of time based media events;

identifying, by the computer processor, a second user subset identifying users of the social networking system who authored the second subset of the social media content items mapped to the time based media events; and processing, by the computer processor, the user subset and the second user subset to identify a proportion of the users authoring social media content items that are interested in the particular time based media event relative to the plurality of time based media events.

10. The method of claim 9, wherein the second plurality of mappings include the first plurality of mappings, the second subset of social media content items include the first subset of social media content items, and the plurality of time based media events include the particular time based media event.

11. The method of claim 9, wherein the time based media event and the plurality of time based media events are events of a common event type.

12. A system comprising:

a processor;

an engine executing on the computer processor and configured to:

identify a plurality of social media content items authored by users of a social networking system and publicly broadcasted by the social networking system;

access in a computer repository a plurality of mappings between a time based media event corresponding to a chronological segment of time based broadcast media and a subset of the social media content items designated as being relevant to the time based media event;

programmatically identify a user subset comprising users of the social networking system who authored the subset of the social media content items mapped to the time based media event;

access a consumption metric regarding a size of an audience for the broadcast of the time based media event; and calculate a level of engagement on social media based on the size of the audience associated with the consumption metric and based on a number of users in the user subset.

13. The system of claim 12, wherein the level of engagement is based on a ratio of a number of users in the user subset and the size of the audience.

14. The system of claim 12, further comprising filtering the user subset based on a demographic filter, the demographic filter based on at least one selected from a group consisting of: age, gender, and geographic location.

15. The system of claim 12, wherein the consumption metric is based on demographic information for the audience, and wherein the method further comprises filtering the size of the audience of the consumption metric based on the demographic filter.

16. The system of claim 12, wherein the time based media event is an advertisement type media event, wherein the time based media event is associated with a monetary cost, and wherein the engine is further configured to:

divide at least one selected from a group consisting of (i) a number of users in the user subset and (ii) a number of social media content items in the subset of social media content items, by the monetary cost to determine an engagement per dollar value for the time based media event.

17. The system of claim 12, wherein the subset of social media content items are authored within a time period of an airing of the time based media event.

18. The system of claim 12, wherein the consumption metric is at least one selected from a group consisting of an estimated viewing audience size for the time based media event and an estimated audience size capable of viewing the time based media event via television.

19. The system of claim 12, wherein the engine is further configured to:

accessing a second plurality of mappings between a plurality of time based media events corresponding to the chronological segment and a second subset of the social media content items determined to be relevant to at least one of the plurality of time based media events;

identifying, by the computer processor, a second user subset identifying users of the social networking system who authored the second subset of the social media content items mapped to the time based media events; and processing, by the computer processor, the user subset and the second user subset to identify a proportion of the users authoring social media content items that are interested in the particular time based media event relative to the plurality of time based media events.

20. The system of claim 19, wherein the second plurality of mappings include the first plurality of mappings, the second subset of social media content items include the first subset of social media content items, and the plurality of time based media events include the particular time based media event.

21. The system of claim 19, wherein the time based media event and the plurality of time based media events are events of a common event type.

22. A method comprising:

programmatically identifying a plurality of social media content items authored by users of a social networking system and publicly broadcasted by the social networking system;

programmatically identifying a television show comprising a plurality of time based media events for broadcast across a plurality of different chronological segments of time based broadcast media;

calculating, by a computer processor, a number of pre-airing mappings between the television show and a subset of previously authored social media content items designated as being relevant to the television show that were authored before an airing of a particular time based media event of the television show;

calculating, by the computer processor, a number of post-airing mappings between the particular time based media event and a subset of new social media content items determined to be relevant to the particular time based media event that were authored after the airing of the particular time based media event; and calculating, by the computer processor, an audience response acceleration due to the airing of the particular time based media event based on the number of pre-airing mappings and the number of post airing mappings.

* * * * *